United States Patent
Mizon et al.

(10) Patent No.: US 7,895,913 B2
(45) Date of Patent: *Mar. 1, 2011

(54) SPIRAL CAM CLUTCH ACTUATION SYSTEM

(75) Inventors: Richard Mizon, Fayetteville, NY (US); John D. Zalewski, Liverpool, NY (US)

(73) Assignee: MAGNA Powertrain USA, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/692,668

(22) Filed: Jan. 25, 2010

(65) Prior Publication Data

US 2010/0122884 A1    May 20, 2010

Related U.S. Application Data

(63) Continuation of application No. 11/626,510, filed on Jan. 24, 2007, now Pat. No. 7,650,808.

(60) Provisional application No. 60/765,489, filed on Feb. 3, 2006.

(51) Int. Cl.
- *F16H 59/00* (2006.01)
- *F16H 61/00* (2006.01)
- *F16H 63/00* (2006.01)
- *F16D 19/00* (2006.01)
- *F16D 21/00* (2006.01)
- *F16D 23/00* (2006.01)

(52) U.S. Cl. .............. 74/337.5; 192/84.6; 192/93 R

(58) Field of Classification Search ........... 74/337.5; 192/84.6, 84.7, 93 A, 70.23

See application file for complete search history.

(56) References Cited

U.S. PATENT DOCUMENTS

| | | | |
|---|---|---|---|
| 2,827,994 A * | 3/1958 | Tiedeman et al. | 192/93 A |
| 5,078,249 A * | 1/1992 | Botterill | 192/93 A |
| 5,352,164 A * | 10/1994 | Bensinger et al. | 475/223 |
| 5,407,024 A * | 4/1995 | Watson et al. | 180/248 |
| 5,465,820 A * | 11/1995 | Dick | 192/35 |
| 6,783,475 B2 * | 8/2004 | Gazyakan et al. | 475/210 |
| 6,929,577 B2 * | 8/2005 | Mueller et al. | 475/295 |
| 7,081,064 B2 * | 7/2006 | Mueller et al. | 475/204 |
| 7,399,251 B2 * | 7/2008 | Mueller et al. | 475/295 |
| 7,650,808 B2 * | 1/2010 | Mizon et al. | 74/337.5 |
| 2005/0205376 A1 * | 9/2005 | Kemper | 192/48.2 |

* cited by examiner

*Primary Examiner*—Tisha D Lewis
(74) *Attorney, Agent, or Firm*—Harness, Dickey & Pierce, P.L.C.

(57) ABSTRACT

A power transmission device for a motor vehicle includes a clutch for transferring torque between first and second shafts. A clutch actuation system includes a drive member and a cam member in cooperation with one another. The drive member is driven by an electric motor and includes first and second rollers rotatably mounted thereon. The cam member includes first and second circumferentially extending channels, each having a continually reducing radius. The first and second channels are separate from and overlap one another. The first roller is positioned within the first channel to engage the drive member and the cam member. The second roller is positioned within the second channel to engage the drive member and the cam member such that relative rotation between the drive member and the cam member translates the cam member along an axis of relative rotation to vary the force applied to the clutch.

18 Claims, 19 Drawing Sheets

SPIRAL CAM CLUTCH ACTUATION SYSTEM

CROSS REFERENCE TO RELATED APPLICATIONS

This application is a continuation of U.S. patent application Ser. No. 11/626,510 filed on Jan. 24, 2007, now U.S. Pat. No. 7,650,808 which application claims the benefit of U.S. Provisional Application Ser. No. 60/765,489 filed Feb. 3, 2006. The entire disclosures of each of the above applications are incorporated herein by reference.

FIELD

The present invention relates generally to power transfer systems for controlling the distribution of drive torque between the front and rear drivelines of a four-wheel drive vehicle. More particularly, the present invention is directed to a power transmission device for use in motor vehicle driveline applications having a power-operated clutch actuator that is operable for controlling actuation of a multi-plate friction clutch assembly.

BACKGROUND

In view of increased consumer popularity in four-wheel drive vehicles, a plethora of power transfer systems are currently being utilized in vehicular driveline applications for selectively directing power (i.e., drive torque) from the powertrain to all four wheels of the vehicle. In many power transfer systems, a transfer case is incorporated into the driveline and is operable in a four-wheel drive mode for delivering drive torque from the powertrain to both the front and rear wheels. Many conventional transfer cases are equipped with a mode shift mechanism that can be selectively actuated to shift between a two-wheel drive mode and a part-time four-wheel drive mode. In addition, many transfer cases also include a range shift mechanism which can be selectively actuated by the vehicle operator to engage a reduction gearset for shifting between four-wheel high-range and low-range drive modes.

It is also known to use "on-demand" power transfer systems for automatically biasing power between the front and rear wheels, without any input or action on the part of the vehicle operator, when traction is lost at either the front or rear wheels. Modernly, it is known to incorporate the "on-demand" feature into a transfer case by replacing the mechanically-actuated mode shift mechanism with a friction clutch assembly and a power-operated clutch actuator that is interactively associated with an electronic control system and a sensor arrangement. During normal road conditions, the friction clutch assembly is typically maintained in a released condition such that drive torque is only delivered to the rear wheels. However, when the sensors detect a low traction condition, the clutch actuator is actuated for engaging the friction clutch assembly to deliver drive torque "on-demand" to the front wheels. Typically, the amount of drive torque transferred through the friction clutch assembly to the non-slipping wheels is varied as a function of specific vehicle dynamics, as detected by the sensor arrangement. This on-demand clutch control system is also used in "full-time" transfer cases to automatically bias the torque ratio across an interaxle differential.

In some two-speed transfer cases, the range shift mechanism and the clutch assembly are independently controlled by separate power-operated actuators. For example, U.S. Pat. No. 5,407,024 discloses a two-speed range shift mechanism actuated by an electric motor and a friction clutch assembly actuated by an electromagnetic ballramp unit. In an effort to reduce cost and complexity, some transfer cases are equipped with a single power-operated actuator that is operable to coordinate actuation of both the range shift mechanism and the clutch assembly. In particular, U.S. Pat. Nos. 5,363,938 and 5,655,986 each illustrate a transfer case equipped with a motor-driven sector having cam surfaces adapted to coordinate actuation of the range shift mechanism and the clutch assembly for establishing a plurality of distinct two-wheel and four-wheel drive modes.

While transfer cases equipped with such coordinated actuation systems have been commercially successful, a need exists to develop alternative clutch actuation systems which further reduce the cost and complexity of two-speed actively-controlled transfer cases.

SUMMARY

Accordingly, it is an objective of the present invention to provide a transfer case equipped with a two-speed range unit, a mode clutch assembly and a power-operated actuation mechanism for controlling coordinated actuation of the range unit and the mode clutch assembly.

It is another objective of the present invention that the transfer case be interactively associated with a control system for controlling operation of the power-operated actuation mechanism to establish various four-wheel high-range and low-range drive modes.

It is another objective of the present invention to locate the mode clutch assembly across an interaxle differential to provide automatic torque biasing and slip limiting features in a full-time four-wheel drive mode.

It is another objective of the present invention to locate the mode clutch assembly between the front and rear output shafts of the transfer case to provide automatic torque transfer in an on-demand four-wheel drive mode.

Another objective of the present invention is to provide a synchronized range unit for permitting on-the-move shifting between the high-range and low-range drive modes.

It is another objective of the present invention to provide a power-operated actuation mechanism having a range actuator assembly operable to control actuation of the two-speed range unit, a mode actuator assembly operable to control actuation of the mode clutch assembly and a motor-driven geartrain operable to control actuation of the range and mode actuator assemblies.

It is another objective of the present invention to provide the mode actuator assembly with a roller ramp unit having a face cam with cam surfaces and a control gear with rollers engaging the cam surfaces.

It is another objective of the present invention to mount the rollers on pins to permit radial travel of the rollers within spiral or other non-constant radius cam surfaces formed on the face cam.

According to these and other objectives of the present invention, a transfer case is provided with a two-speed range unit, a mode clutch assembly, a power-operated actuation mechanism and a control system. The range unit includes a planetary gearset driven by an input shaft and a range clutch for releasably coupling one of the input shaft and an output component of the planetary gearset to a first output shaft. The mode clutch assembly is a multi-plate friction clutch operably disposed between the first output shaft and a second output shaft. The power-operated actuation mechanism includes an electric motor, a geartrain driven by the motor, a range actuator assembly and a mode actuator assembly. The range actuator assembly includes a driveshaft driven by the geartrain, a range cam rotatively driven by the driveshaft and a shift collar associated with the range clutch. Rotation of the range cam results in transitional movement of the shift collar between high-range (H), neutral (N) and low-range (L) positions. The mode actuator assembly is a roller ramp unit having a face cam with cam surfaces and a control gear with rollers engaging the cam surfaces. The control gear is rotatively driven by the geartrain for initially causing concurrent rotation of the face cam. This initial rotary non-translational movement of the face cam permits sufficient rotation of the driveshaft to move the shift collar between its three range position while the friction clutch is maintained in a disengaged state. An anti-rotation mechanism limits rotation of the face cam upon continued rotation of the control gear such that engagement of the rollers on the cam surfaces causes translational non-rotary movement of the face cam. Such translational movement of the face cam functions to control the magnitude of a clutch engagement force applied to the friction clutch. The control system is adapted to control the magnitude and direction of rotary motion of the driveshaft and the control gear through controlled energization of the electric motor.

The power-operated actuation mechanism of the present invention is arranged to permit sufficient bi-directional rotation of the geartrain to cause movement of the shift collar between its H and L positions without causing the roller ramp unit to engage the multi-plate friction clutch. However, once the shift collar is positively located in either of its H or L positions, continued rotation of the geartrain causes actuation of the roller ramp unit for generating and applying the clutch engagement force on the multi-plate friction clutch.

Additionally, a power transmission device for a motor vehicle includes a clutch for transferring torque between a first shaft and a second shaft. A clutch actuation system includes a drive member and a cam member in cooperation with one another. The drive member is driven by an electric motor and includes first and second rollers rotatably mounted thereon. The cam member includes first and second circumferentially extending channels, each having a continually reducing radius. The first and second channels are separate from and overlap one another. The first roller is positioned within the first channel to engage the drive member and the cam member. The second roller is positioned within the second channel to engage the drive member and the cam member such that relative rotation between the drive member and the cam member translates the cam member along an axis of relative rotation to vary a magnitude of force applied to the clutch.

Furthermore, the present disclosure describes a power transmission device for use in a motor vehicle having a powertrain and a driveline. A clutch selectively transmits drive torque between an input shaft adapted to be driven by the powertrain and an output shaft adapted to drive the driveline. An electric motor rotates a driveshaft. A clutch operator includes a first member rotatably driven by the driveshaft, a second member axially moveable between first and second positions for controlling the magnitude of a clutch engagement force applied to the clutch, and a cam mechanism for converting rotary movement of the first member into axial movement of the second member. The cam mechanism includes a roller rotatably mounted to the first member and a spiral channel formed in the second member within which the roller is disposed. The channel includes a cam surface engaged by the roller and configured to cause radial movement of the roller and axial movement of the second member between its first and second positions in response to rotation of the first member relative to the second member.

DRAWINGS

Further objects, features and advantages of the present invention will become apparent from analysis of the following written specification including the appended claims, and the accompanying drawings in which:

DETAILED DESCRIPTION

Figure 1:
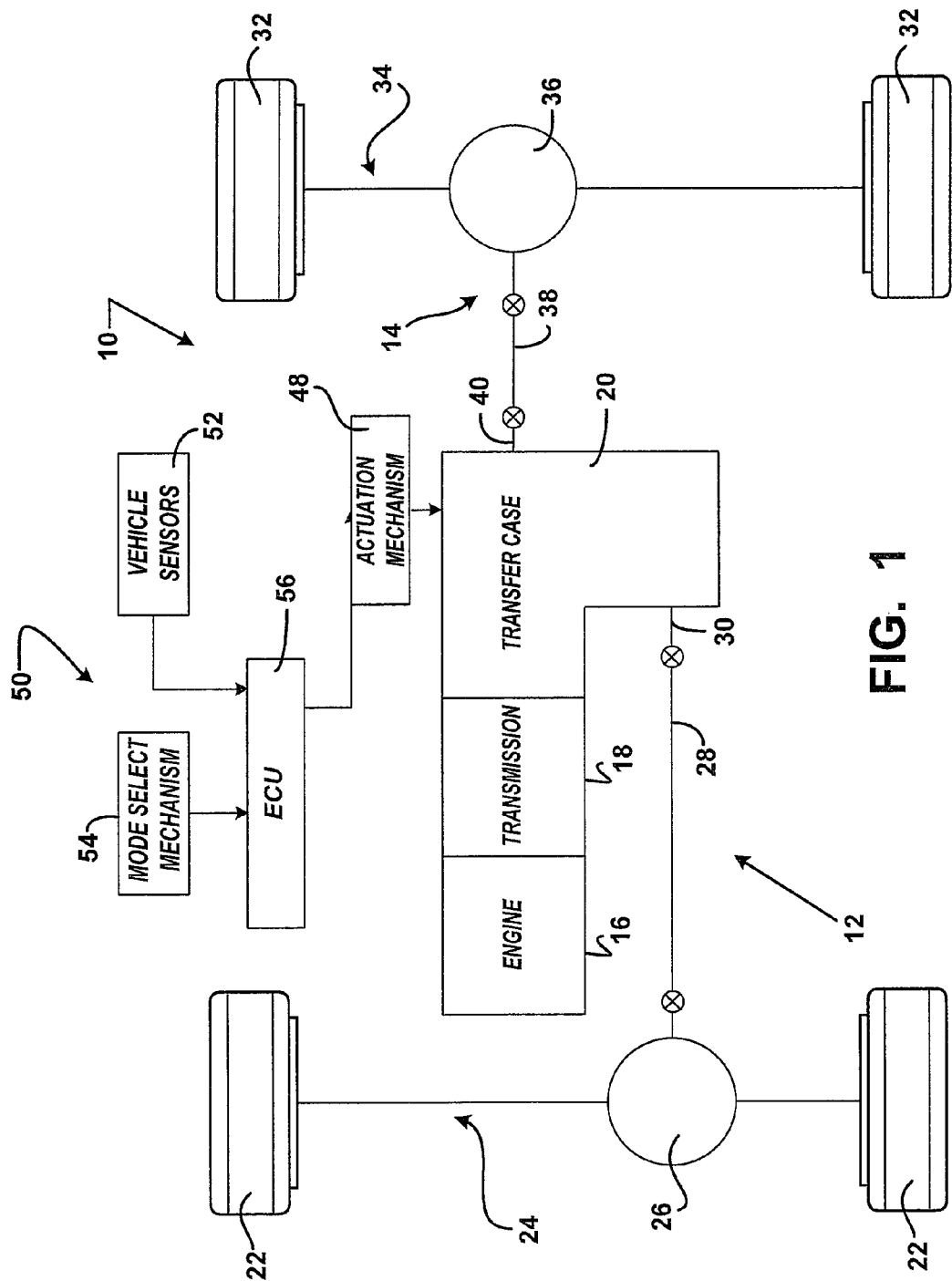
FIG. 1 is a schematic view of a four-wheel drive vehicle equipped with a transfer case and a control system according to the present invention.

Referring now to the drawings, a four-wheel drive vehicle 10 is schematically shown to include a front driveline 12, a rear driveline 14 and a powertrain for generating and selectively delivering rotary power (i.e., drive torque) to the drivelines. The powertrain is shown to include an engine 16 and a transmission 18 which may be of either the manual or automatic type. In the particular embodiment shown, vehicle 10 further includes a transfer case 20 for transmitting drive torque from engine 16 and transmission 18 to front driveline 12 and rear driveline 14. Front driveline 12 includes a pair of front wheels 22 connected at opposite ends of a front axle assembly 24 having a front differential 26 that is coupled to one end of a front driveshaft 28, the opposite end of which is coupled to a front output shaft 30 of transfer case 20. Similarly, rear driveline 14 includes a pair of rear wheels 32 connected at opposite ends of a rear axle assembly 34 having a rear differential 36 coupled to one end of a rear driveshaft 38, the opposite end of which is interconnected to a rear output shaft 40 of transfer case 20.

As will be further detailed, transfer case 20 is equipped with a two-speed range unit 42, an interaxle differential 44, a mode clutch assembly 46 and a power-operated actuation mechanism 48 that is operable to control coordinated shifting of range unit 42 and adaptive engagement of mode clutch assembly 46. In addition, a control system 50 is provided for controlling actuation of actuation mechanism 48. Control system 50 includes vehicle sensors 52 for detecting real time operational characteristics of motor vehicle 10, a mode select mechanism 54 for permitting the vehicle operator to select one of the available drive modes, and an electronic controller unit (ECU) 56 that is operable to generate electric control signals in response to input signals from sensors 52 and mode signals from mode select mechanism 54. The control signals are sent to an electric motor assembly 58 associated with actuation mechanism 48.

Figure 2:
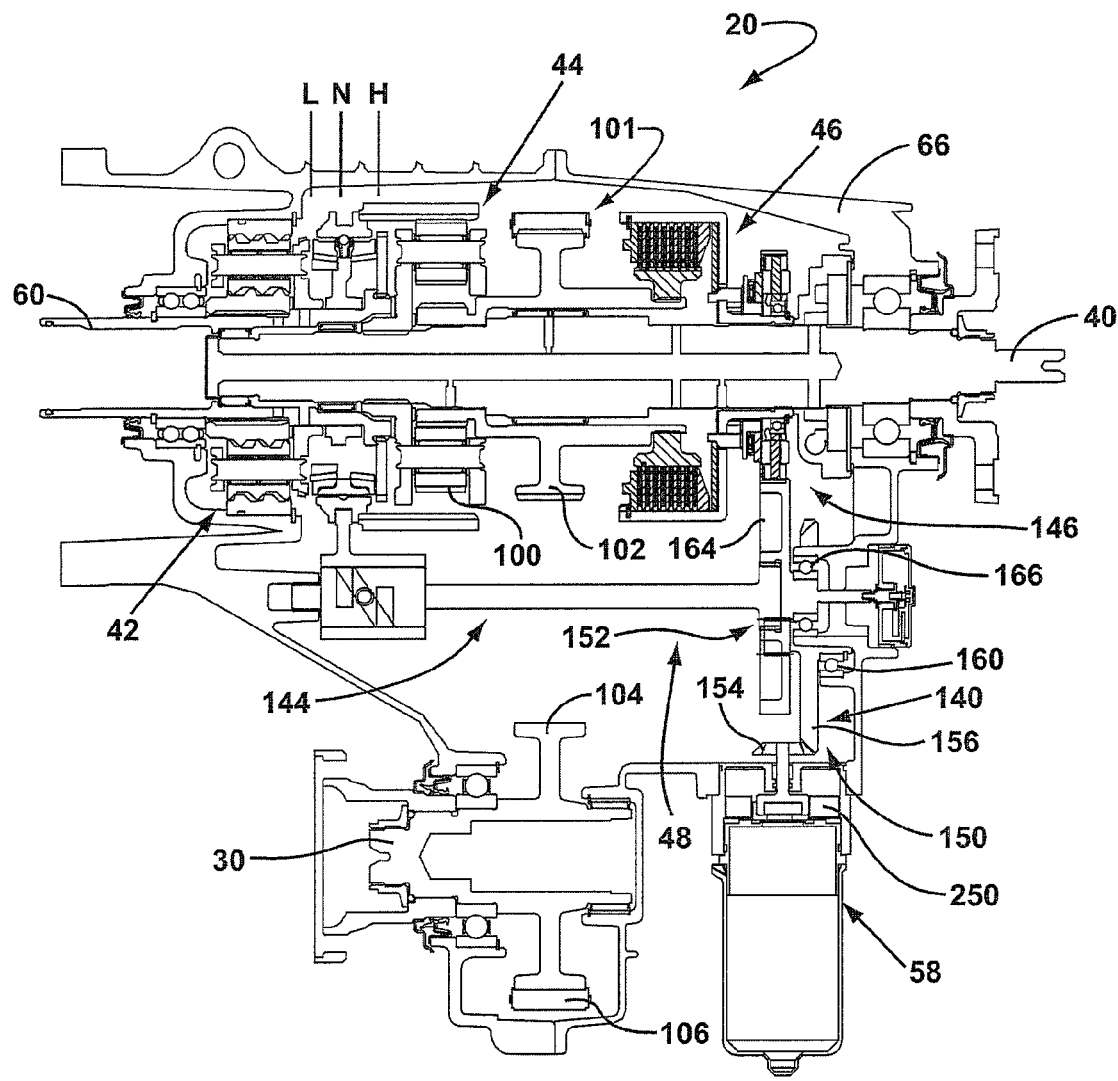
FIG. 2 is a sectional view of a two-speed full-time transfer case constructed in accordance with one preferred embodiment of the present invention.
Figure 3:
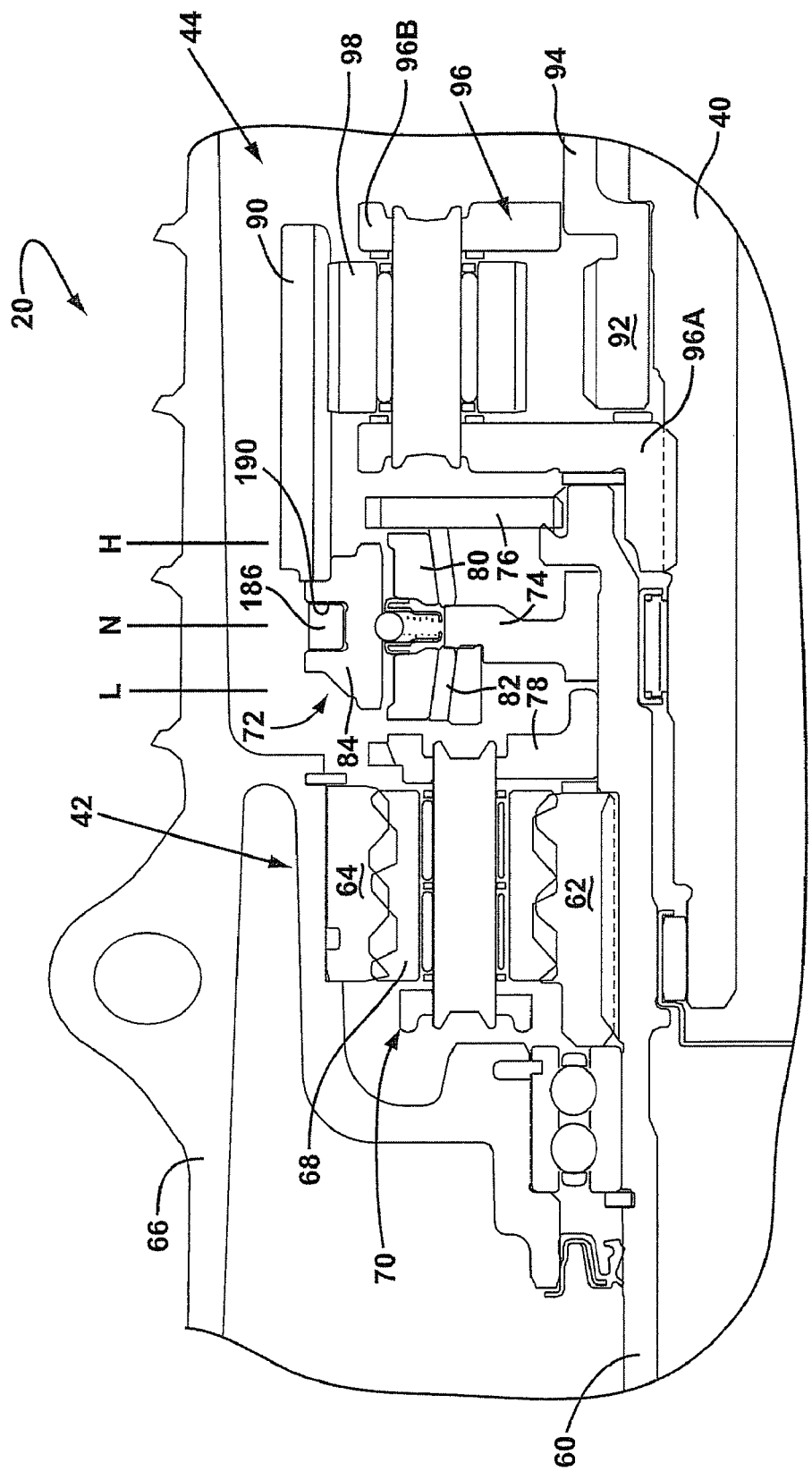
FIGS. 3 through 5 are enlarged partial views of FIG. 2 showing the two-speed range unit, interaxle differential, mode clutch assembly and power-operated actuation mechanism associated with the two-speed full-time transfer case in greater detail.

With particular reference to FIGS. 2 and 3, transfer case 20 is shown to include an input shaft 60 adapted to be driven by the output shaft of transmission 18. Range unit 42 includes a planetary gearset having a sun gear 62 fixed (i.e., splined) for rotation with input shaft 60, a ring gear 64 non-rotatably fixed to a portion of a housing 66 and a set of planet gears 68 rotatably supported from a planet carrier 70. Each planet gear 68 is meshed with both sun gear 62 and ring gear 64. Range unit 42 further includes a synchronized dog clutch assembly 72 having a clutch hub 74 journaled on input shaft 60, a first clutch plate 76 fixed for rotation with input shaft 60 and a second clutch plate 78 fixed for rotation with planet carrier 70. Synchronized dog clutch assembly 72 further includes a first synchronizer 80 disposed between clutch hub 74 and first clutch plate 76, a second synchronizer 82 disposed between clutch hub 74 and second clutch plate 78 and a shift collar 84 splined for rotation with and axial sliding movement on clutch hub 74. As will be detailed, shift collar 84 is arranged to selectively drive an input member of interaxle differential 44.

Shift collar 84 is shown in its central neutral (N) position where it is disengaged from both first clutch plate 76 and second clutch plate 78. With shift collar 84 in its N position, transfer case 20 is in a Neutral non-driven mode with input shaft 60 uncoupled from driven connection with the input of interaxle differential 44, whereby no drive torque is transmitted to either of the output shafts. Shift collar 84 is moveable from its N position to a high-range (H) position whereat shift collar 84 is coupled to first clutch plate 76 and is driven at a direct speed ratio relative to input shaft 60. Accordingly, location of shift collar 84 in its H range position functions to establish a high-range drive connection between input shaft 60 and the input to interaxle differential 44. In contrast, shift collar 84 can be moved from its N position to a low-range (L) position whereat shift collar 84 is coupled to second clutch plate 78 and is driven by planet carrier 70 at a reduced speed ratio relative to input shaft 60. Such movement of shift collar 84 to its L range position functions to establish a low-range drive connection between input shaft 60 and the input to interaxle differential 44. First synchronizer 80 functions to establish speed synchronization between shift collar 84 and input shaft 60 during movement of shift collar 84 toward its H position. Likewise, second synchronizer 82 functions to establish speed synchronization between shift collar 84 and planet carrier 70 during movement of shift collar 84 toward its L position.

It is contemplated that transfer case 20 could be equipped without synchronizers 80 and 82 if a non-synchronized range shift system is desired. Likewise, the planetary gearset and range shift arrangement shown are intended to merely be representative of one type of two-speed range unit available for use in transfer cases. To this end, any two-speed reduction unit having a shift member moveable to establish first and second ratio drive connections is considered to be within the scope of this invention.

Interaxle differential 44 includes an input member driven by shift collar 84, a first output member driving rear output shaft 40 and a second output member operably arranged to drive front output shaft 30. In particular, interaxle differential 44 includes an annulus gear 90 fixed for rotation and axial sliding movement with shift collar 84, a sun gear 92 fixed to a quill shaft 94 that is rotatably supported on rear output shaft 40, and a pinion carrier assembly 96 that is fixed (i.e., splined) for rotation with rear output shaft 40. Pinion carrier assembly 96 includes a first carrier ring 96A fixed (i.e., splined) for rotation with rear output shaft 40, a second carrier ring 96B, and pins rotatably supporting meshed pairs of first pinion gears 98 and second pinion gears 100 (see FIG. 2) therebetween. In addition, first pinion gears 98 are meshed with annulus gear 90 while second pinion gears 100 are meshed with sun gear 92. As such, driven rotation of annulus gear 90 (at either of the direct or reduced speed ratios) causes drive torque to be transmitted to rear output shaft 40 via pinion carrier assembly 96 and to quill shaft 94 via sun gear 92. Drive torque is transferred from quill shaft 94 to front output shaft 30 through a transfer assembly 101 which includes a drive sprocket 102 fixed to quill shaft 94, a driven sprocket 104 fixed to front output shaft 30, and a drive chain 106 meshed with sprockets 102 and 104. Based on the particular configuration and sizing of the gears associated with interaxle differential 44, a specific torque distribution ratio is established (i.e., 50/50, 64/36) between rear output shaft 40 and front output shaft 30.

Figure 4:
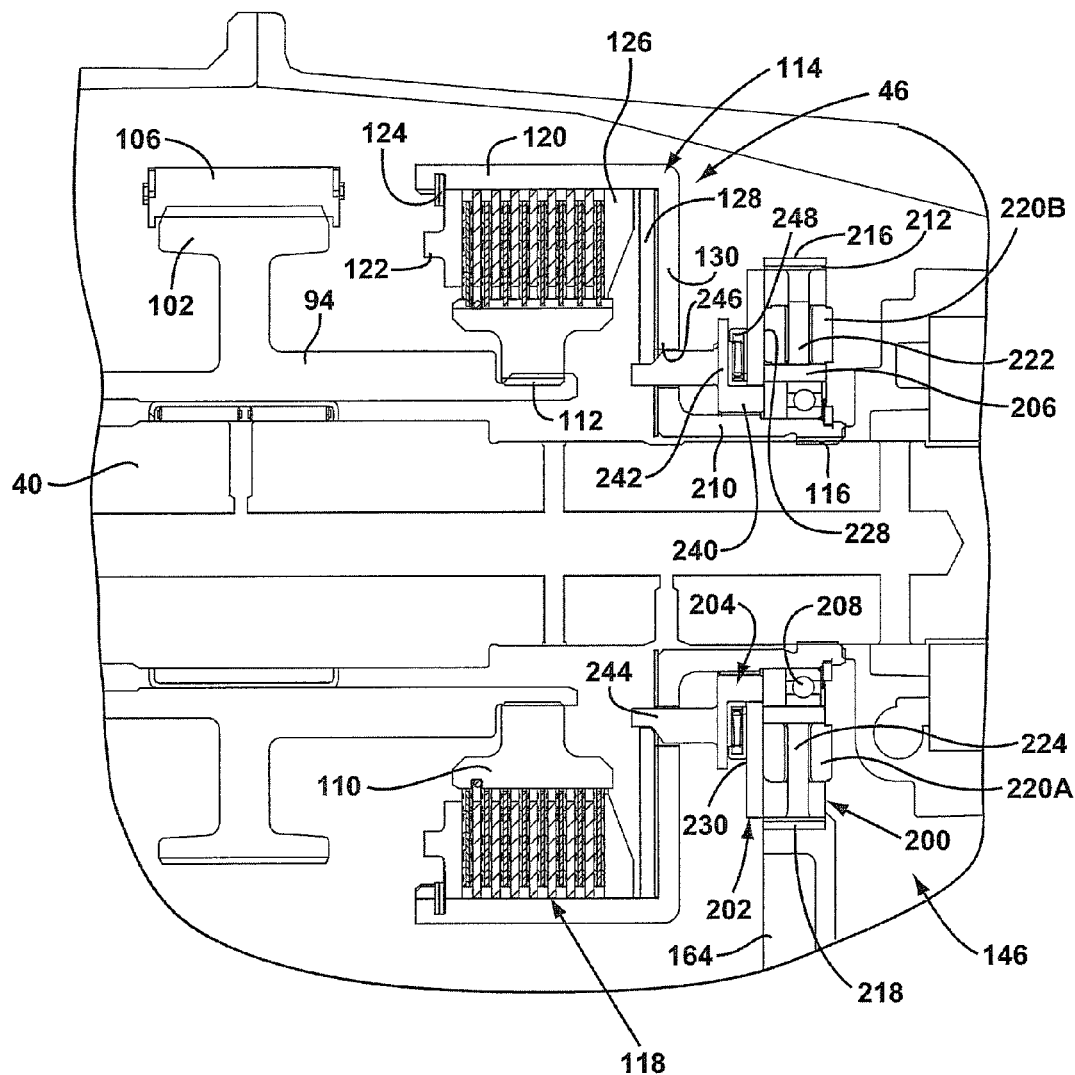

Referring primarily to FIG. 4, mode clutch assembly 46 is shown to include a clutch hub 110 fixed via a spline connection 112 to a tubular end segment of quill shaft 94, a clutch drum 114 fixed via a spline connection 116 to rear output shaft 40, and a multi-plate clutch pack 118 operably disposed between hub 110 and drum 114. Clutch pack 118 includes a set of outer clutch plates that are splined for rotation with and axial movement on an outer cylindrical rim segment 120 of drum 114. Clutch pack 118 also includes a set of inner clutch plates that are splined for rotation with and axial movement on clutch hub 110. Clutch assembly 46 further includes a reaction plate 122 that is splined for rotation with outer rim segment 120 of drum 114 and retained thereon via a lock ring 124, and a pressure plate 126 that is also splined for rotation with outer rim segment 120 of drum 114. Pressure plate 126 is adapted to move axially for exerting a compressive clutch engagement force on clutch pack 118 in response to resilient pivotal movement of disk levers 128. Disk levers 128 are shown to be located between pressure plate 126 and a radial plate segment 130 of drum 114.

Pressure plate 126 is axially moveable relative to clutch pack 118 between a first or "released" position and a second or "locked" position. With pressure plate 126 in its released position, a minimum clutch engagement force is exerted on clutch pack 118 such that virtually no drive torque is transferred through clutch assembly 46 so as to establish a differentiated or full-time four-wheel drive mode. In contrast, location of pressure plate 126 in its locked position causes a maximum clutch engagement force to be applied to clutch pack 118 such that front output shaft 30 is, in effect, coupled for common rotation with rear output shaft 40 so as to establish a non-differentiated or locked four-wheel drive mode. Therefore, accurate control of the position of pressure plate 126 between its released and locked position permits adaptive regulation of the torque biasing between rear output shaft 40 and front output shaft 30, thereby establishing an adaptive all-wheel drive mode.

Power-operated actuation mechanism 48 is operable to coordinate movement of shift collar 84 between its three distinct range positions with movement of pressure plate 126 between its released and locked positions. In its most basic form, actuation mechanism 48 includes an electric motor assembly 58, a reduction geartrain 140 driven by motor assembly 58, a range actuator assembly 144 and a mode actuator assembly 146.

Reduction geartrain 140 is shown to include a first gearset 150 and a second gearset 152. First gearset 150 is preferably a bevel gearset having a drive pinion 154 driven by an output shaft of electric motor assembly 58 and which is meshed with a bevel gear 156 so as to provide a first reduction ratio. As seen, bevel gear 156 is rotatably supported by a bearing assembly 160 from housing 66 for rotation about a first rotary axis. The first reduction ratio established by bevel gearset 150 is preferably in the range of 3:1 to 10:1 and, more preferably, is about 6:1. Second gearset 152 is preferably a spur gearset having a first gear 162 rigidly secured to bevel gear 156 for common rotation about the first rotary axis and which is meshed with a second gear 164 so as to provide a second reduction ratio. Second gear 164 is rotatably supported from housing 66 by a bearing assembly 166 for rotation about a second rotary axis. Preferably, the second reduction ratio provided by spur gearset 152 is similar in range to that of bevel gearset 150 with a preferred ratio of about 6:1. A cumulative speed reduction ratio of about 36:1 between the output shaft of electric motor assembly 58 and second gear 164 permits the use of a small, low power electric motor.

Figure 5:
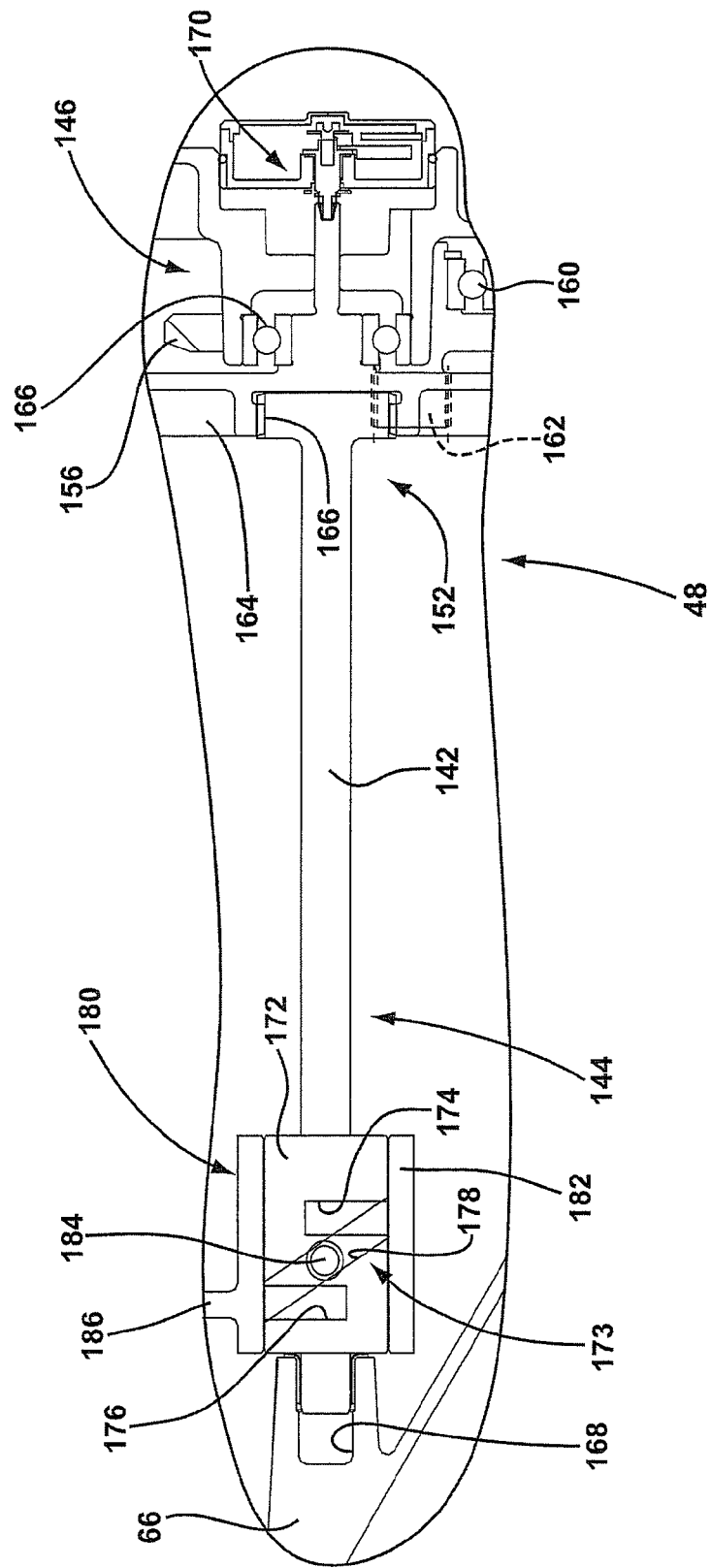
Figure 6:
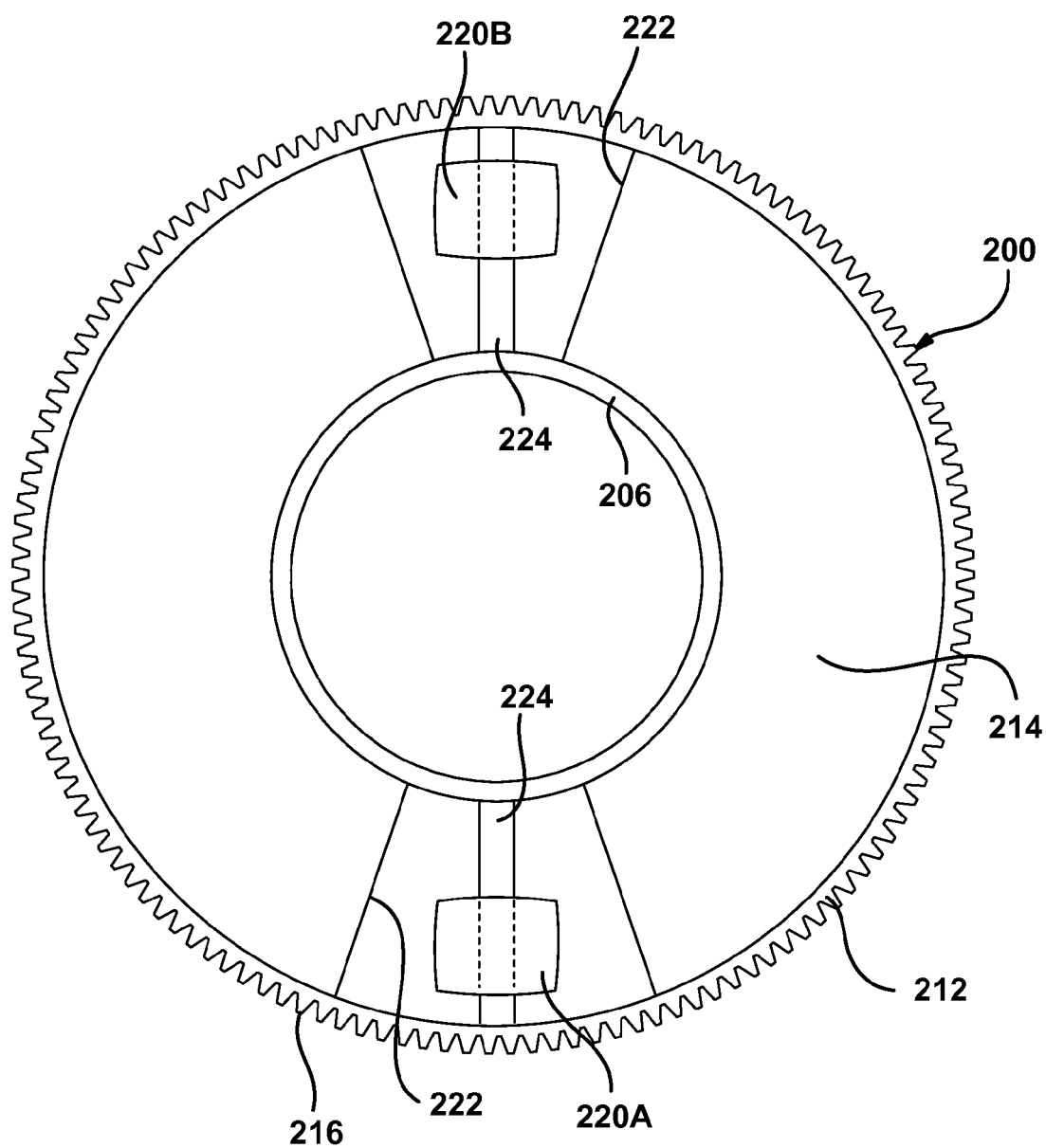
FIG. 6 is a side view of a control gear associated with a roller ramp unit.

Referring primarily to FIG. 5, range actuator assembly 144 is shown to include a driveshaft 142 and a range cam 172 that is fixed for rotation with driveshaft 142. As seen, driveshaft 142 has a first end fixed via a spline connection 166 for common rotation with second gear 164 and a second end that is rotatably supported in a socket 168 formed in housing 66. In addition, an angular position sensor, such as an encoder unit 170, is provided for accurately detecting the rotated position of second gear 164. Range cam 172 is cylindrical and includes a groove 173 comprised of a high-range dwell segment 174, a low-range dwell segment 176 and a helical intermediate shift segment 178 interconnecting dwell segments 174 and 176. Range actuator assembly 144 further includes a range fork 180 having a tubular sleeve 182 surrounding range cam 172, a follower pin 184 which extends from range fork sleeve 182 into groove 173, and a fork segment 186 extending from sleeve 182 into an annular groove 190 formed in shift collar 84.

Rotation of range cam 172 results in controlled axial movement of shift collar 84 due to the movement of follower pin 184 within shift segment 178 of groove 173. Specifically, when it is desired to shift range unit 42 into its high-range drive mode, electric motor 58 is energized to cause rotation of second gear 164 and driveshaft 142 in a first direction which, in turn, causes concurrent rotation of range cam 172. Such rotation of range cam 172 causes follower pin 184 to move within intermediate shift segment 178 of groove 173 until shift collar 84 is axially located in its H range position. With shift collar 84 in its H range position, the high-range drive connection is established between input shaft 60 and annulus gear 90. Continued rotation of driveshaft 142 in the first direction causes follower pin 184 to exit shift segment 178 and enter high-range dwell segment 174 which is configured to maintain shift collar 84 in its H range position. Thereafter, concurrent rotation of second gear 164, driveshaft 142 and range cam 172 in the opposite or second direction causes follower pin 184 to exit high-range dwell segment 174 and re-enter helical shift segment 178 for causing shift collar 84 to begin moving from its H range position toward its L range position. Upon continued rotation of range cam 172 in the second direction, follower pin 184 exits shift segment 178 and enters low-range dwell segment 176 of groove 173 for axially locating shift collar 84 in its L range position and establishing the low-range drive connection between planet carrier 70 and annulus gear 90.

Figure 7:
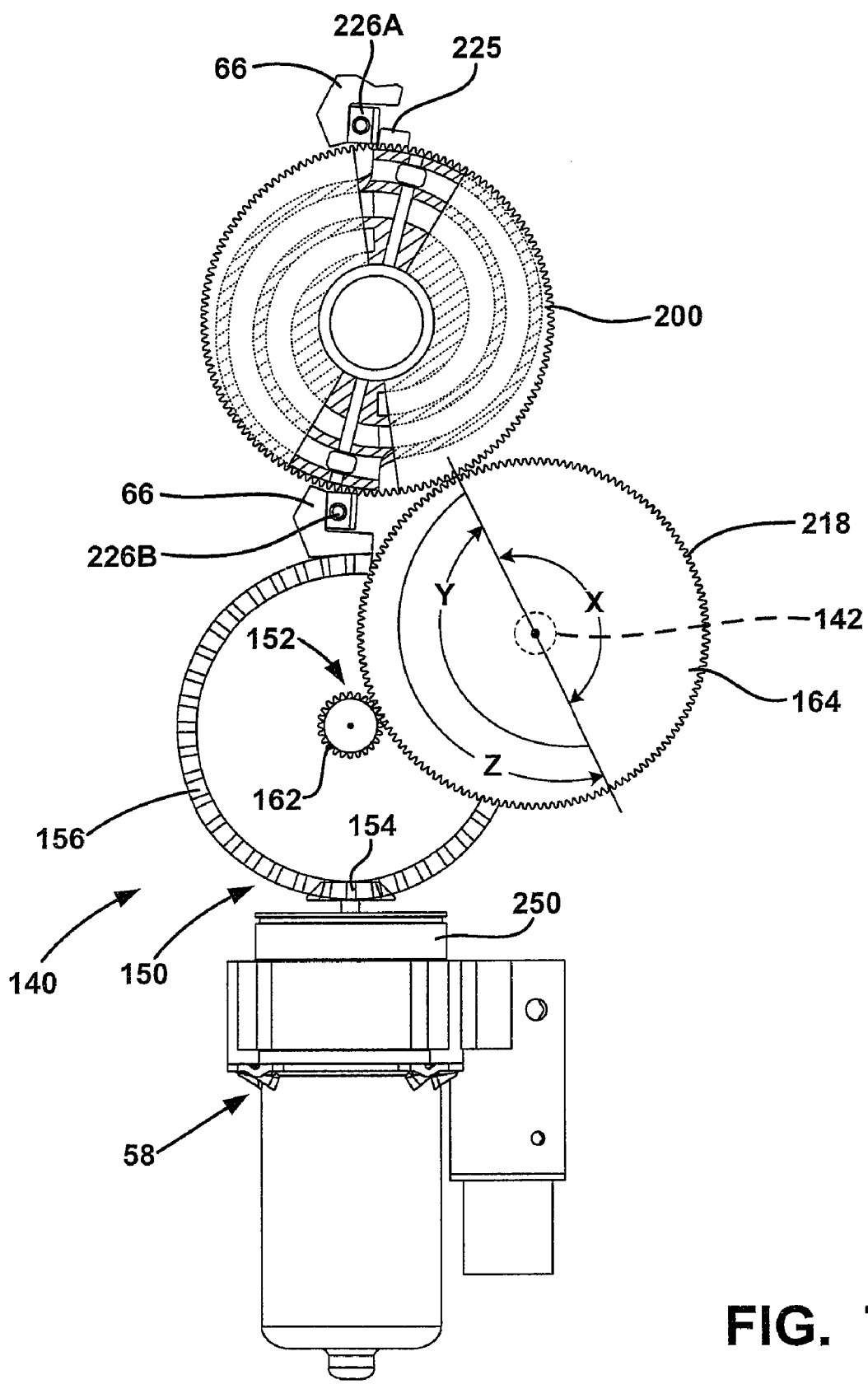
FIG. 7 illustrates various components associated with the power-operated actuation mechanism.

As best seen from FIGS. 2 and 4, mode actuator assembly 146 surrounds rear output shaft 40 and includes a drive member 200, a cam member 202, and a thrust member 204. Drive member, hereinafter referred to as control gear 200, has a cylindrical inner rim segment 206 rotatably supported by a bearing assembly 208 on an inner sleeve segment 210 of clutch drum 114, a cylindrical outer rim segment 212, and a plate-like web segment 214 therebetween. Outer rim segment 212 is shown to have external gear teeth 216 extending entirely around its outer circumference that are in constant meshed engagement with gear teeth 218 on second gear 164. The relative orientation of geartrain 140 and electric motor 58 to control gear 200 is best shown in FIG. 7. According to a preferred construction, the size and number of teeth 218 on second gear 164 are identical to the size and number of teeth 216 on control gear 200 to provide a direct (i.e., 1:1) ratio therebetween. Control gear 200 further includes a pair of diametrically opposed rollers 220A and 220B that are retained in channels 222 formed in web segment 214. In particular, rollers 220A and 220B are each shown to be mounted for rotation and sliding movement on a pin 224 which is secured between the inner and outer rim segments of control gear 200.

As best seen from FIG. 8, cam member, hereinafter referred to as face cam 202, is a ring-like structure having a central aperture surrounding inner sleeve segment 210 of drum 114 and an outwardly extending anti-rotation lug 225. Lug 225 is retained between a pair of diametrically opposed anti-rotation shoulder stops 226A and 226B formed on housing 66 so as to permit rotation of face cam 202 through a range of angular travel delimited by anti-rotation stops 226A and 226B. In the arrangement shown, the range of rotary movement for face cam 202 is about 180°. Face cam 202 defines a first face surface 228 and a second face surface 230. Extending inwardly from first face surface 228 are a first channel 232 and a second channel 234, with each channel having a "spiral" or other non-constant radial path relative to the central rotary axis of face cam 202. First channel 232 defines a cam surface 236 having a first or high-range ramp segment 236A and a second or low-range ramp segment 236B, both of which have an angular length of about 180°. Likewise, second channel 234 defines a cam surface 238 having a first or high-range segment 238A and a second or low-range segment 238B, both of which have an angular length of about 180°.

Roller 220A of control gear 200 is retained within first channel 232 and rollingly engages first cam surface 236 while roller 220B is retained within second channel 234 and rollingly engages second cam surface 238. As noted, rollers 220A and 220B slide on pins 224 which function to accommodate the non-constant radial path defined by channels 232 and 234. In fact, high-range ramp segments 236A and 238A are similarly tapered or otherwise contoured to control axial movement of face cam 202 between a retracted position and an extended position relative to control gear 200 when shift collar 84 is located in its H range position. Likewise, low-range ramp segments 236A and 236B are similarly tapered or otherwise contoured to control axial movement of face cam 202 between its retracted and extended positions when shift collar 84 is located in its L range position. As will be detailed, face cam 202 is axially moved between its retracted and extended positions when it is prevented from rotating with control gear 200 due to engagement of its lug 225 with one of anti-rotation stops 226A and 226B.

Figure 9:
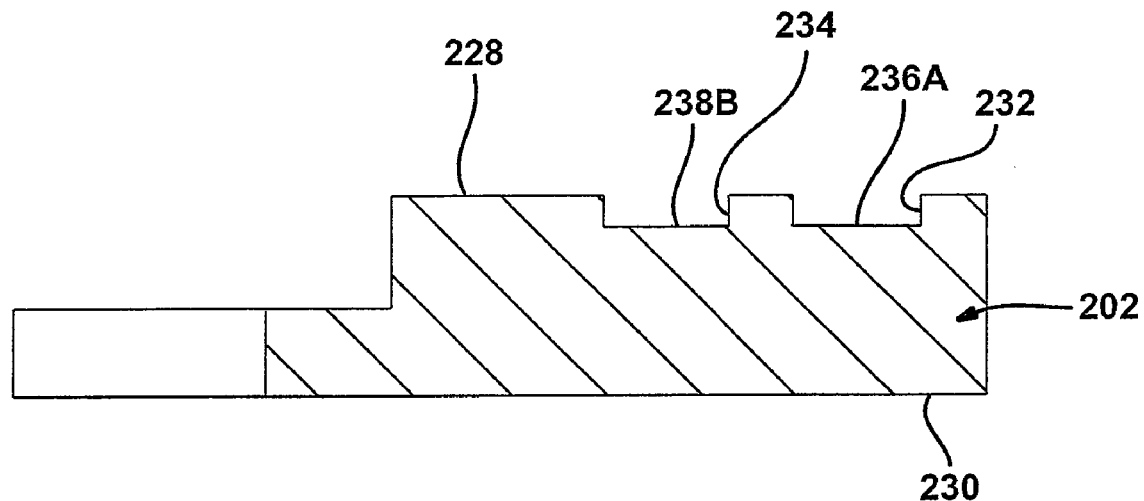
FIG. 9 is a partial sectional view taken along line A-A of FIG. 8 showing recessed channel-type cam surfaces formed in the face cam.
Figure 10:
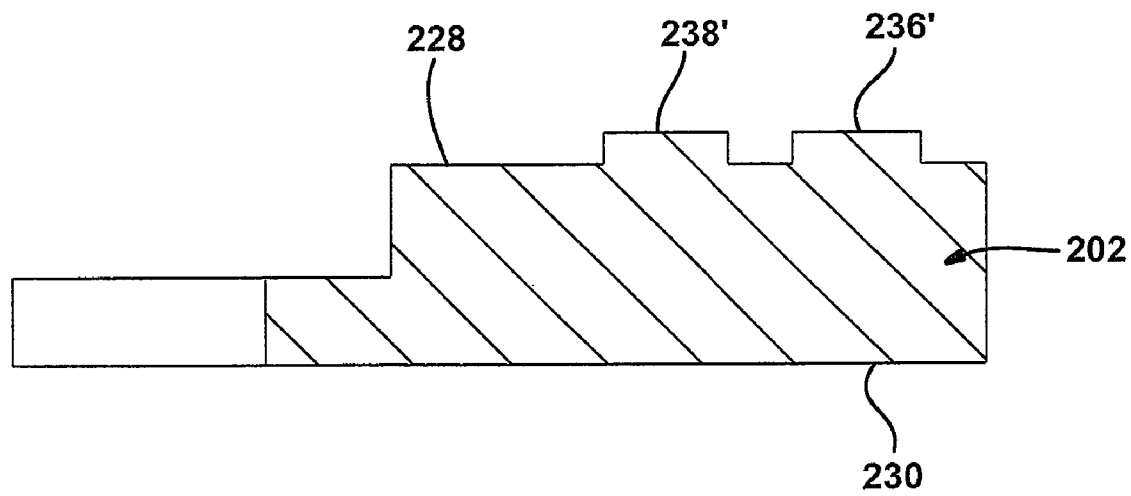
FIG. 10 is similar to FIG. 9 except that it depicts raised flange-type cam surfaces formed on the face cam.

FIG. 9 is partial sectional view showing channels 232 and 234 formed in first face 228 of face cam 202. The depth of channels 232 and 234 will vary due to the tapered profile of cam surfaces 236 and 238, but the edge surfaces function to maintain rollers 220A and 220B therein. As an option, FIG. 10 illustrates face cam 202 having raised cam surfaces 236' and 238' formed on first face surface 228 in place of channels. To accommodate the non-constant radial path of cam surface 236' and 238', rollers 220A and 220B would be ridge or otherwise provided with flanged portions to overhang opposite sides of the cam surfaces.

Thrust member 204 includes a hub segment 240 surrounding inner sleeve segment 210 of drum 114, a plate segment 242 extending radially from hub segment 240 and a plurality of circumferentially-spaced thrust pins 244 that extend axially from plate segment 242. Each thrust pin 244 has a terminal end which extends through a bore 246 formed in plate segment 130 of drum 114 and which is adapted to engage the free end of disk levers 128. A thrust bearing assembly 248 is provided between second face surface 232 of face cam 202 and plate segment 242 of thrust member 204.

The biasing force exerted by disk levers 128 on thrust member 204 acts to maintain constant engagement of control gear rollers 220A and 220B with respective cam surfaces 236 and 238 on face cam 202. Accordingly, when face cam 202 is axially located in its retracted position, disk levers 128 are released from engagement with pressure plate 126, whereby pressure plate 126 is located in its released position and clutch assembly 46 is considered to be in a released or non-engaged state. In contrast, axial movement of face cam 202 from its retracted position toward its extended position causes thrust pins 244 to deflect disk levers 128 which, in turn, causes pressure plate 126 to move axially from its released position toward its locked position. As noted, such movement of pressure plate 126 causes a compressive clutch engagement force to be applied to clutch pack 118 for transferring drive torque through clutch assembly 46. Since control gear 200 is restrained from moving axially, rotation of control gear 200 relative to face cam 202 causes rollers 220A and 220B to ride along cam surface 236 and 238 on face cam 202 which, in turn, results in axial movement of face cam 202.

As noted, power-operated actuation mechanism 48 coordinates axial movement of shift collar 84 with axial movement of face cam 202 to establish a plurality of different four-wheel drive modes. The available drive modes include a full-time four-wheel high-range (4WH) drive mode, an adaptive all-wheel high-range (AWH) drive mode, a locked four-wheel high-range (LOCK-4WH) drive mode, a Neutral mode, a full-time four-wheel low-range (4WL) drive mode, an adaptive all-wheel low-range (AWL) drive mode and a locked four-wheel low-range (LOCK-4WL) drive mode. While it is contemplated that mode select mechanism 54 would most likely limit the available selection to the AWH, LOCK-4WH, N and LOCK-4WL drive modes in a typical vehicle application, the following description of each drive mode is provided.

Figure 11A:
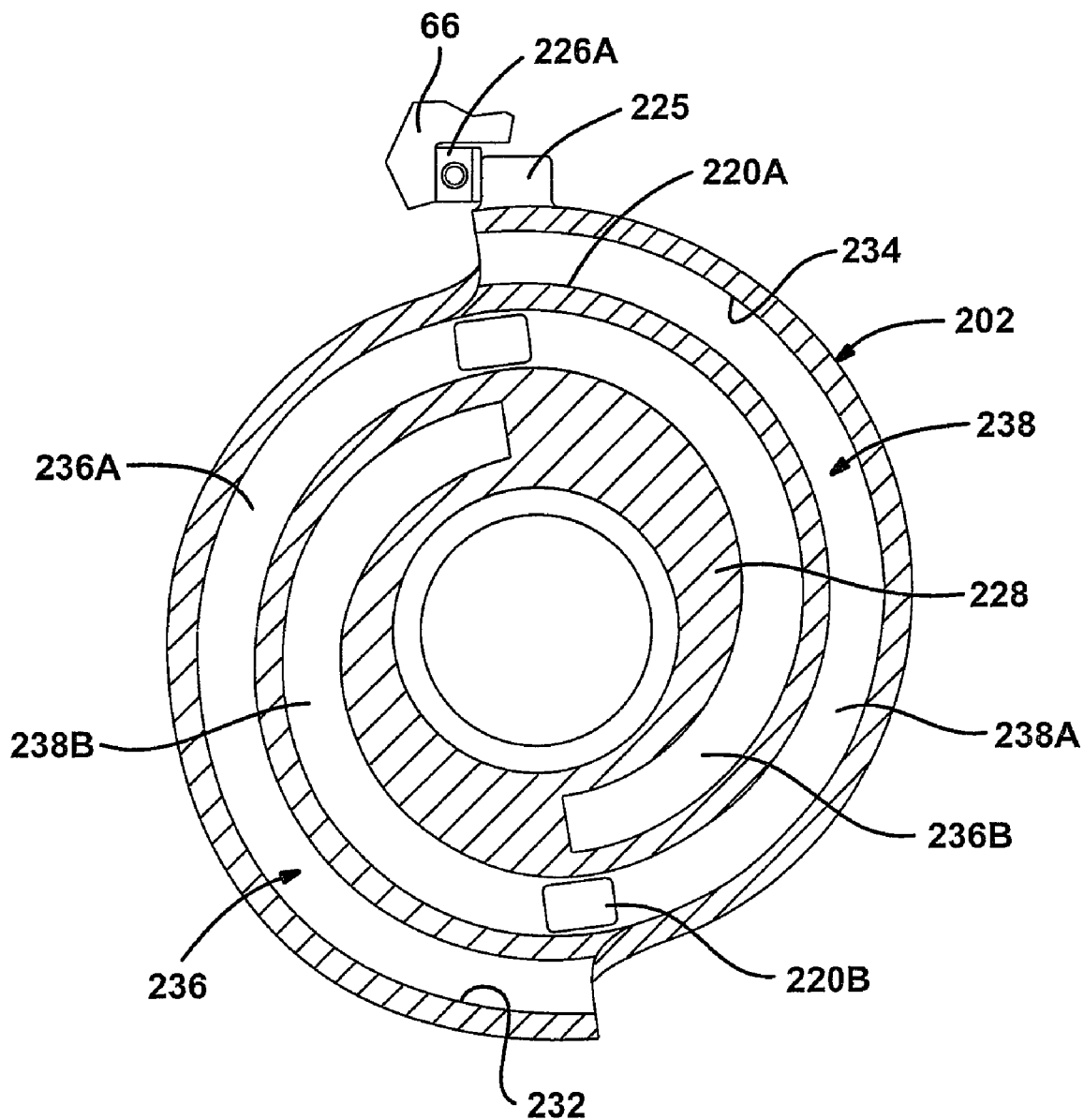
FIGS. 11A through 11G are views of the components associated with the power-operated actuation mechanism in different positions for establishing the various available drive modes.

In operation, when mode select mechanism 54 indicates selection of the 4WH drive mode, ECU 56 signals electric motor 58 to rotate geartrain 140. Specifically, second gear 164 is rotated in a first (i.e., clockwise) direction to a position where: A) concurrent rotation of driveshaft 142 has caused shift collar 84 to move into its H range position; and B) the resulting rotation of control gear 200 in a first (i.e., counter-clockwise) direction has caused concurrent rotation of face cam 202 until its lug 225 engages anti-rotation stop 226A. As seen from FIGS. 8 and 11A, rollers 220A and 220B on control gear 200 bear against cam surfaces 236 and 238 at their respective low or "detent" points 236C and 238C such that face cam 202 is axially located in its retracted position. Furthermore, rollers 220A and 220B are both located at a first radial distance "A" from the origin of face cam 202. As such, pressure plate 126 is located in its released position and clutch assembly 46 is released. With mode clutch assembly 46 released, differential 44 acts as an open differential permitting unrestricted speed differentiation between the two output shafts.

Figure 11B:
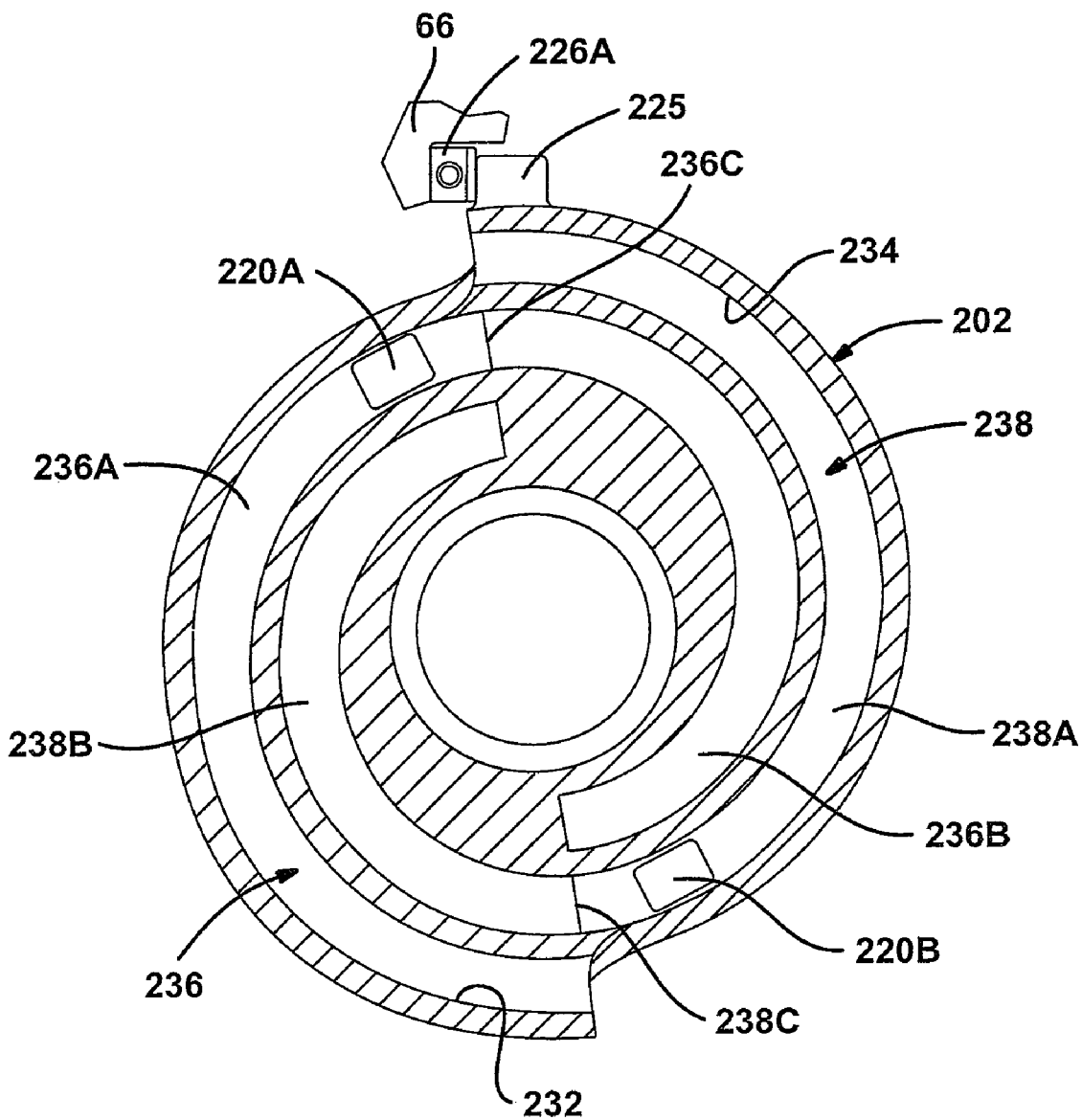

When mode select mechanism 54 thereafter indicates selection of the AWH drive mode, ECU 56 energizes electric motor 58 to cause geartrain 140 to continue rotating second gear 164 in its first direction. As indicated, high-range dwell segment 174 of groove 173 in range cam 172 accommodates this additional rotation of driveshaft 142 resulting from such continued rotation of second gear 164 for maintaining shift collar 84 in its H range position. As is evident, continued rotation of second gear 164 in its first direction results in continued rotation of control gear 200 in its first direction. However, such continued rotation of control gear 200 now causes non-rotary axial movement of face cam 202 from its retracted position toward an intermediate or "adapt" position. Specifically, such axial movement of face cam 202 occurs since tab stop 226A prevents further concurrent rotation of face cam 202 with control gear 200. Thus, the resultant relative rotation of control gear 200 relative to face cam 202 causes rollers 220A and 220B to exit dwell points 236C and 238C and travel along complimentary high-range ramp segments 236A and 238A of face cam 202 to the position shown in FIG. 11B. Such movement of rollers 220A and 220B results in initial axial movement of face cam 202 from its retracted position to its adapt position. The adapt position is selected to locate pressure plate 126 in a ready position so as to provide a predetermined low level of torque transfer across mode clutch assembly 46 to take-up clearances in clutch pack 118 in preparation for subsequent adaptive control. Thereafter, ECU 56 determines when and how much torque needs to be transmitted across mode clutch assembly 46 to limit excessive interaxle slip between the output shafts based on the current tractive conditions and vehicular operating characteristics detected by sensors 52.

Figure 11C:
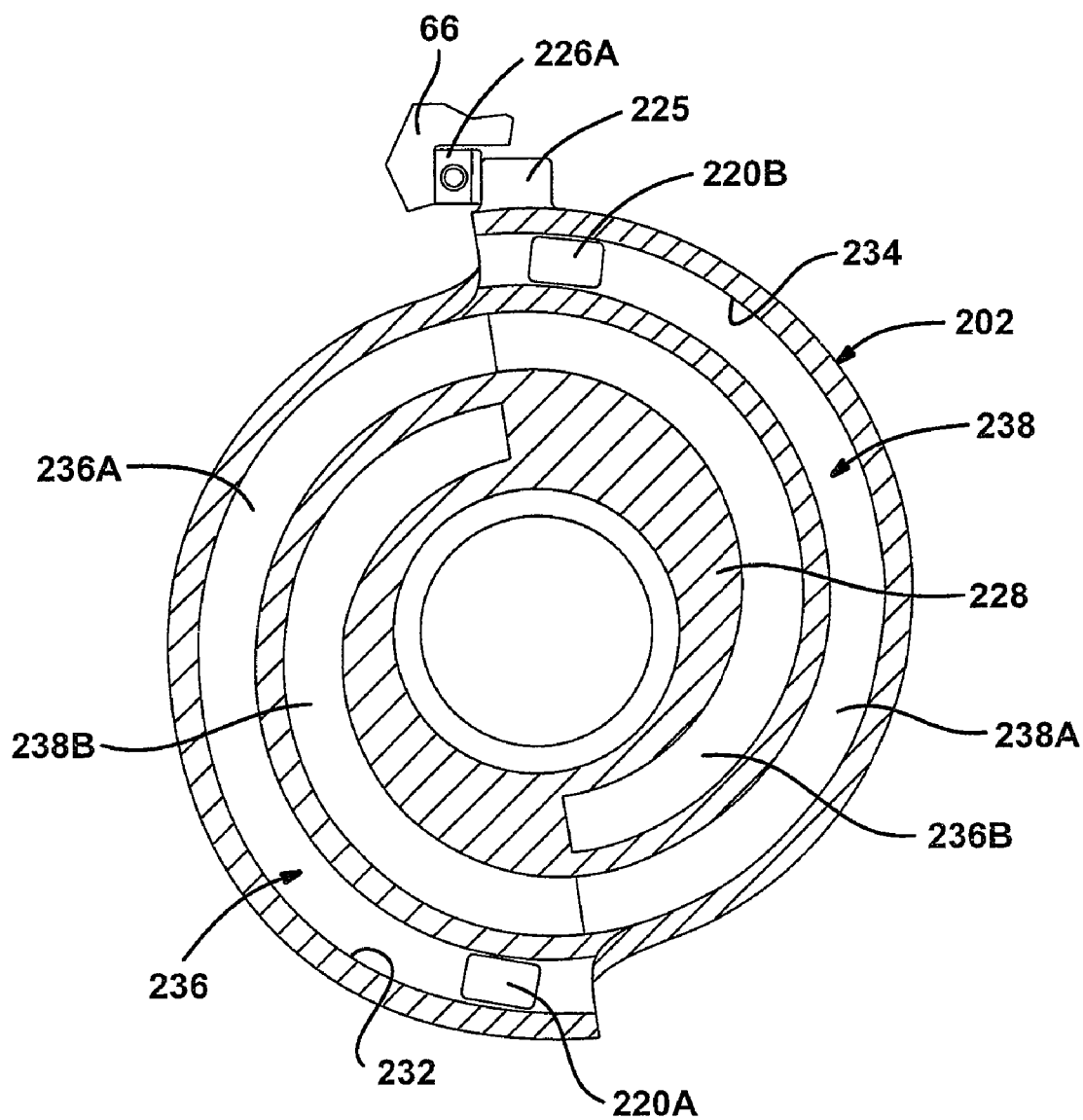

The limits of adaptive torque control in the AWH drive mode are established by controlling bi-directional rotation of control gear 200 through a range of motion operable for axially moving face cam 202 between its adapt and extended positions. Specifically, axial movement of face cam 202 to its extended position results from further rotation of second gear 164 in its first direction until rollers 220A and 220B are located at the end of high-range ramp segments 236A and 238A, as shown in FIG. 11C. Bi-directional rotation of control gear 200 within this range of travel is controlled by ECU 56 controlling energization of electric motor 58 based on a pre-selected torque control strategy. Preferably, the length of high-range ramp segments 236A and 236B of channels 232 and 234 permits about 180° of rotation for control gear 200. As will be understood, any control strategy known in the art for adaptively controlling actuation of clutch assembly 46 can be used with the present invention.

If mode select mechanism 54 indicates that the vehicle operator has selected the LOCK-4WH drive mode, electric motor 58 is energized to rotate second gear 164 and control gear 200 in their respective first directions until rollers 220A and 220B on control gear 200 are located in the positions shown in FIG. 11C. As such, rollers 220A and 220B have rolled up high-range segments 236A and 236B of cam surfaces 236 and 238 which, in turn, has caused face cam 202 to move axially to its extended position. As noted, such movement of face cam 202 to its extended position causes pressure plate 126 to move to its locked position for fully engaging mode clutch assembly 46. As shown in FIG. 8, face cam 202 is located in its axially extended position when rollers 220A and 220B are located at a second radial distance "B" from the center of face cam 202.

To limit the on-time service requirements of electric motor 58, a power-off brake 250 can be provided to brake rotation of the motor shaft so as to prevent back-driven rotation of geartrain 140 for maintaining pressure plate 126 in its locked position. In this manner, electric motor 58 can be shut-off during operation of transfer case 20 in its LOCK-4WH drive mode. To reiterate, shift collar 84 is maintained in its H range position because high-range dwell segment 174 of groove 173 in range cam 172 accommodates the additional rotation of driveshaft 142 caused by rotation of second gear 164 in its first direction which also functions to rotate control gear 200 relative to face cam 202.

Figure 11D:
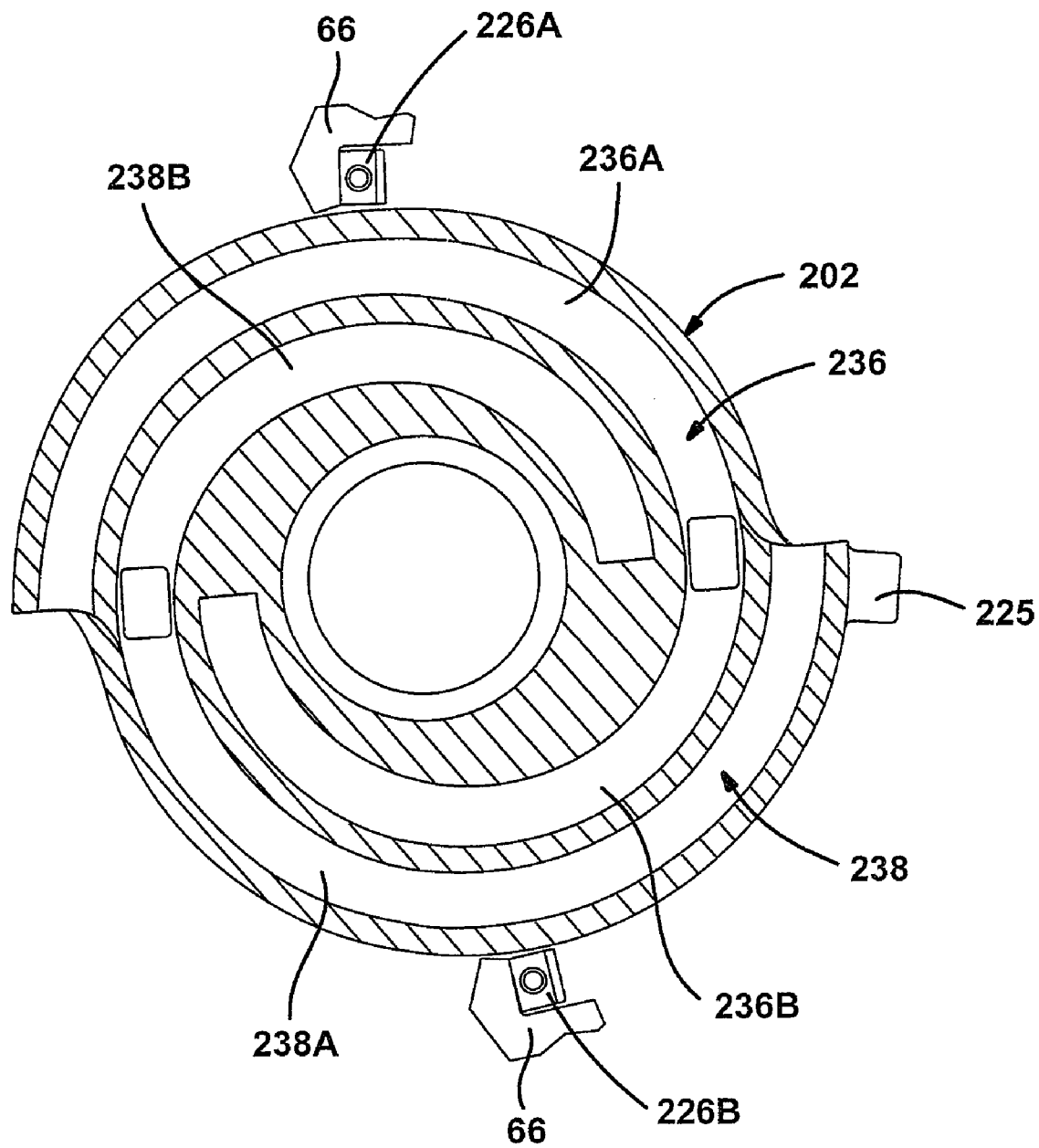

If the Neutral mode is selected, second gear 164 is rotated in its second (i.e., counter-clockwise) direction for concurrently rotating driveshaft 142. Such rotation of driveshaft 142 causes follower pin 184 to ride within shift segment 178 of groove 173 in range cam 172 until shift collar 84 is located in its N position. During such range shifting, mode clutch 46 is maintained in its released state. Specifically, the rotation of second gear 164 in its second direction also causes rotation of control gear 200 in its second (i.e., clockwise) direction from the position shown in FIG. 11A to that shown in FIG. 11D. The continuous engagement of face cam 202 with rollers 220A and 220B on control gear 200 due to the biasing of disk levers 128 causes face cam 202 to also rotate in its second direction in concert with control gear 200. Furthermore, this biasing also causes rollers 220A and 220B to be located at their detent points 236C and 238C, respectively, thereby maintaining face cam 202 in its retracted axial position. As seen, lug 225 is generally located halfway between stops 226A and 226B when the Neutral mode is established.

Figure 11E:
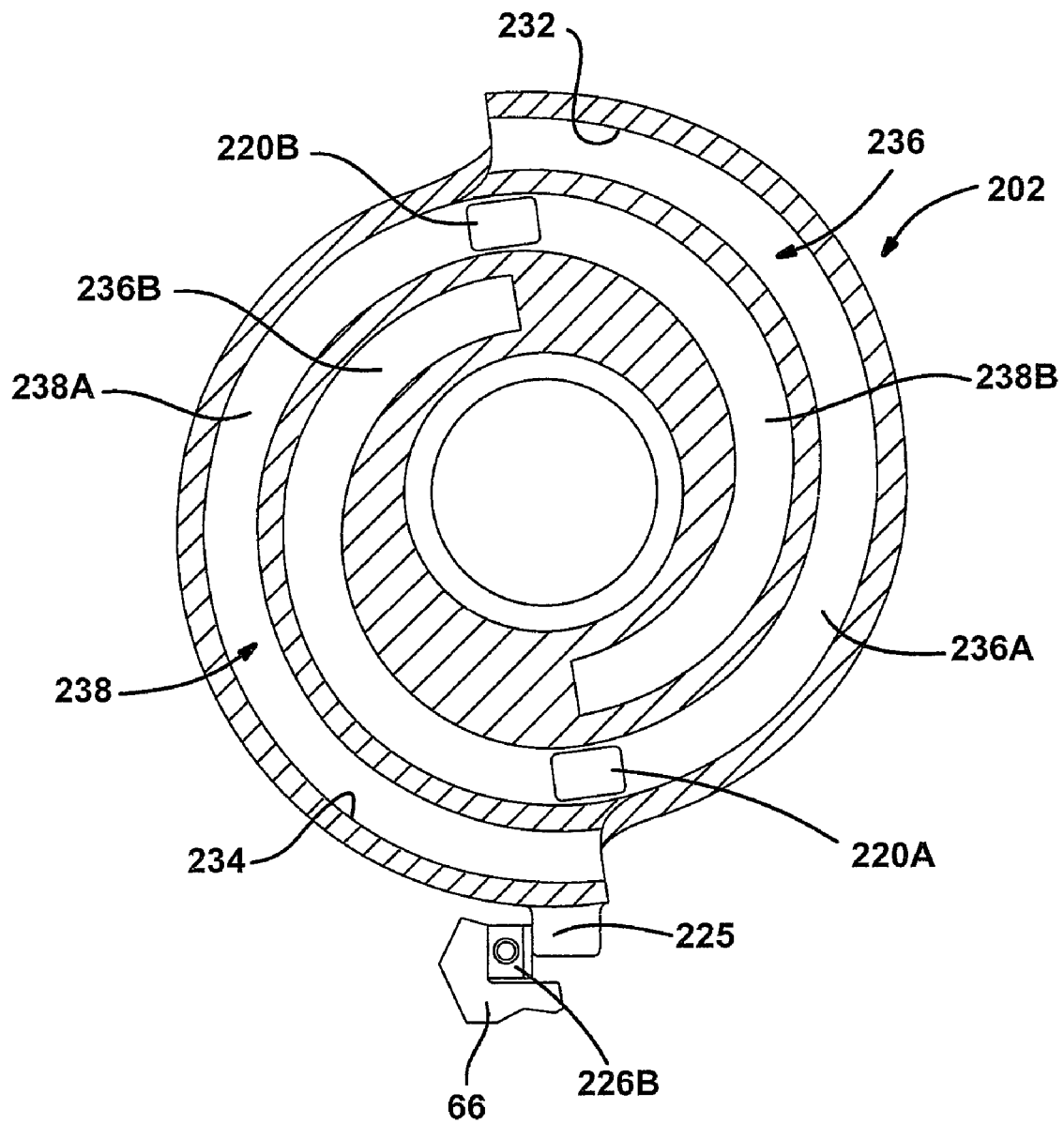

FIG. 11E illustrates the position of the components associated with transfer case 20 for establishing the 4WL drive mode. In particular, second gear 164 has been rotated in its second direction to a position whereat: A) concurrent rotation of driveshaft 142 has caused shift collar 84 to move into its L range position; and B) the resulting rotation of control gear 200 in its second direction has caused face cam 202 to rotate until its lug 225 now engages anti-rotation stop 226B. In this position, face cam 202 is in its retracted axial position such that mode clutch assembly 46 is released.

Figure 11F:
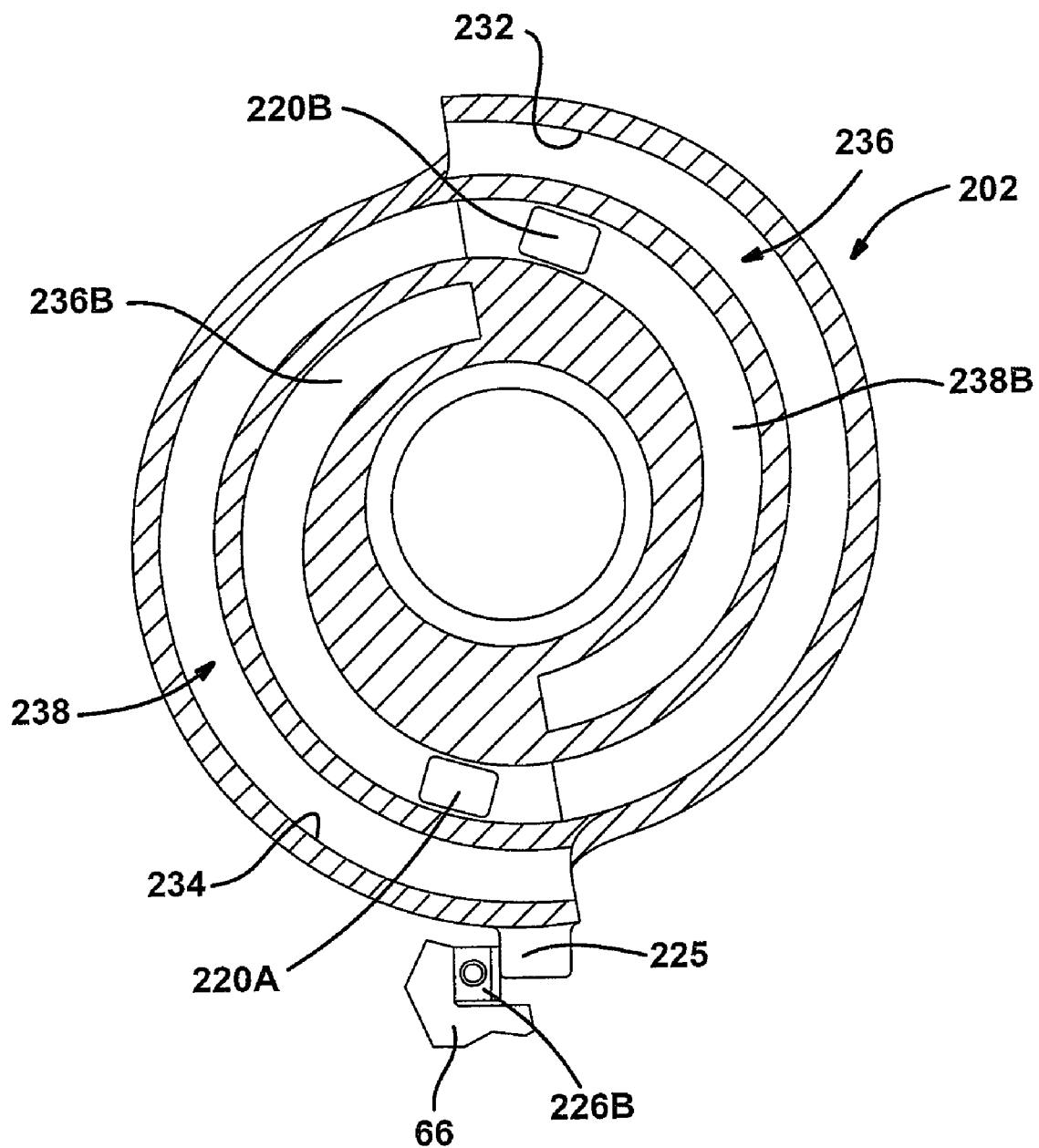

When mode select mechanism 54 indicates selection of the AWL drive mode, ECU 56 energizes motor 58 to cause geartrain 140 to continue rotation of second gear 164 in its second direction. Shift collar 84 is maintained in its L range position due to follower pin 184 entering low-range dwell segment 176 of groove 173 in range cam 172 during such continued rotation of driveshaft 142. Furthermore, engagement of lug 225 with stop 226B prevents further rotation of face cam 202 while control gear 200 continues to rotate until rollers 220A and 220B are located in the positions shown in FIG. 11F. This relative rotation causes face cam 202 to move axially to its adapt position due to rollers 220A and 220B engaging portions of low-range ramp segments 236B and 238B of corresponding cam surfaces 236 and 238. Similar to operation in the AWH drive mode, ECU 56 controls the magnitude of engagement of clutch assembly 46 by controlling movement of the rollers on control gear 200 between the positions shown in FIGS. 11F and 11G which, in turn, moves face cam 202 between its adapt position and its locked positions. Such adaptive control is again based on a predetermined control strategy utilizing the signals inputted to ECU 56 from sensors 52.

Figure 11G:
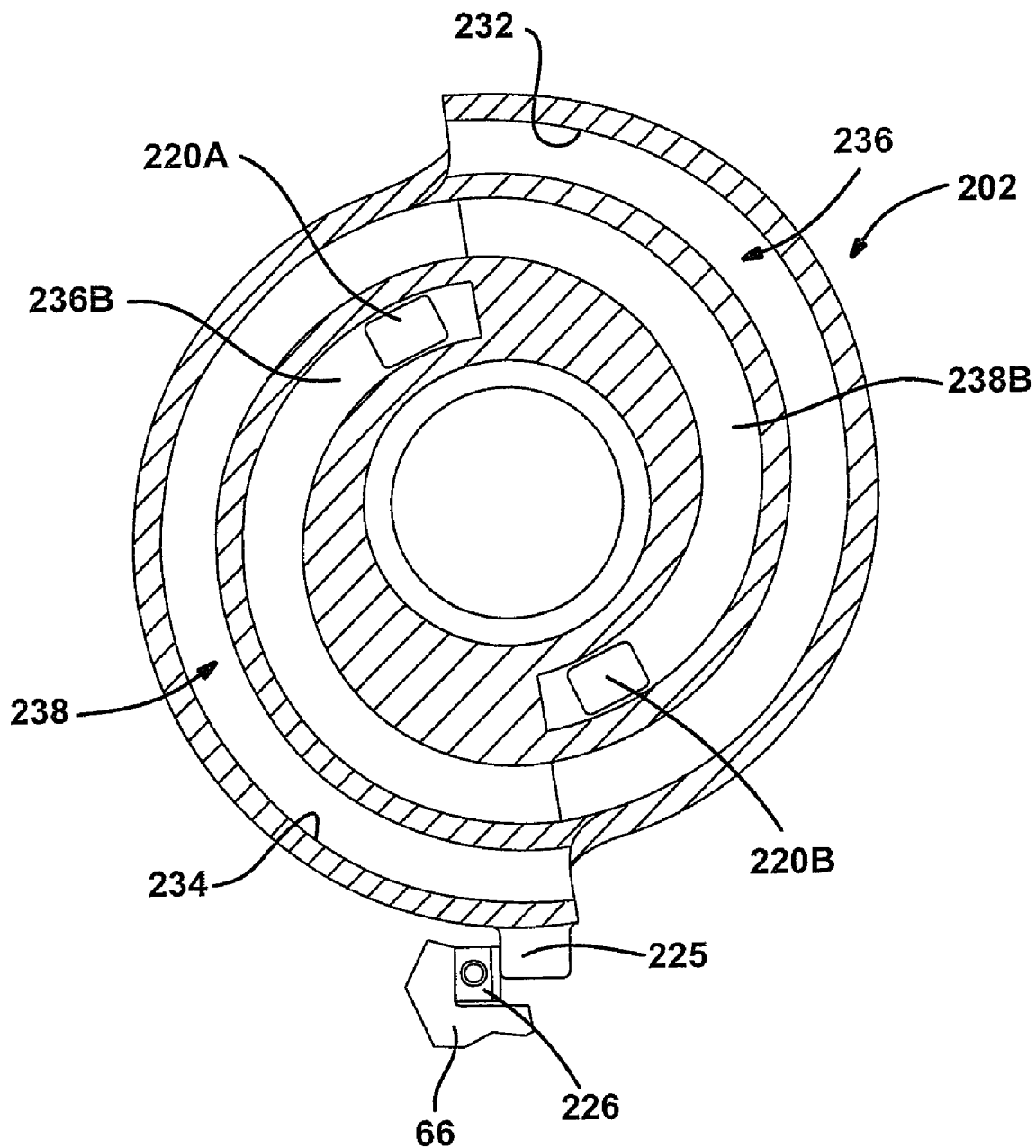

Referring to FIG. 11G, the components are shown for establishing the LOCK-4WL mode with shift collar 84 in its L range position and mode clutch assembly 46 fully engaged due to second gear 164 being rotated in its second direction until control gear 200 is rotated to locate the rollers in the positions shown. In this position, rollers 220A and 220B are radially located a third radial distance "C" from the origin of face cam 202 on low-range ramp segments 236B and 238B such that face cam 202 is located axially in its extended position. Thus, pressure plate 126 is located in its locked position, thereby fully engaging clutch assembly 46. Again, brake 250 would be engaged to prevent rotation of geartrain 140 and hold second gear 164 in the position defining the LOCK-4WL drive mode while permitting electric motor 58 to be de-energized.

According to the present invention, mode actuator assembly 146 and range actuator assembly 144 are interconnected by a common geartrain 140 so as to permit coordinated actuation of both using a single power-operated device, namely electric motor 58. Mode actuator assembly 146 accommodates actuation of range actuator assembly 144 while mode clutch 46 is maintained in a released state for permitting movement of shift collars 84 between its three distinct range positions. Likewise, range actuation assembly 144 accommodates actuation of mode actuator assembly 146 when shift collar 84 is positively located in one of its H and L range positions to permit adaptive engagement of clutch assembly 46. To this end, bi-directional rotation of second gear 164 through two distinct ranges of angular travel achieves this coordination feature. Specifically, a first range, identified in FIG. 7 as angle "X", controls movement of shift collar 84 while cam member 202 is maintained in its retracted position. A second angular range, identified as angle "Y" controls engagement of clutch assembly 46 while shift collar 84 is maintained in either of its H or L range positions.

While actuation mechanism 48 has been disclosed in association with full-time transfer case 20, it will be understood that interaxle differential 44 could be eliminated such that mode clutch assembly 46 functions to modulate the drive torque transferred from rear output shaft 40 to front output shaft 30 to establish an on-demand four-wheel drive mode. A modified version of transfer case 20 shown in FIG. 2 is now shown in FIG. 12 as transfer case 20A which is operable to define various two-wheel and four-wheel drive modes. Basically, shift collar 84 now includes an annular drive ring 254 that is splined to a drive hub 256 fixed (i.e., splined) to rear output shaft 40 while clutch assembly 46 is arranged to transfer drive torque from rear output shaft 40 to front output shaft 30. Again, power-operated actuation mechanism 48 is operable to coordinate movement of shift collar 84 and face cam 202 to establish various locked and on-demand four-wheel high-range and low-range drive modes as well as two-wheel drive modes.

Figure 12:
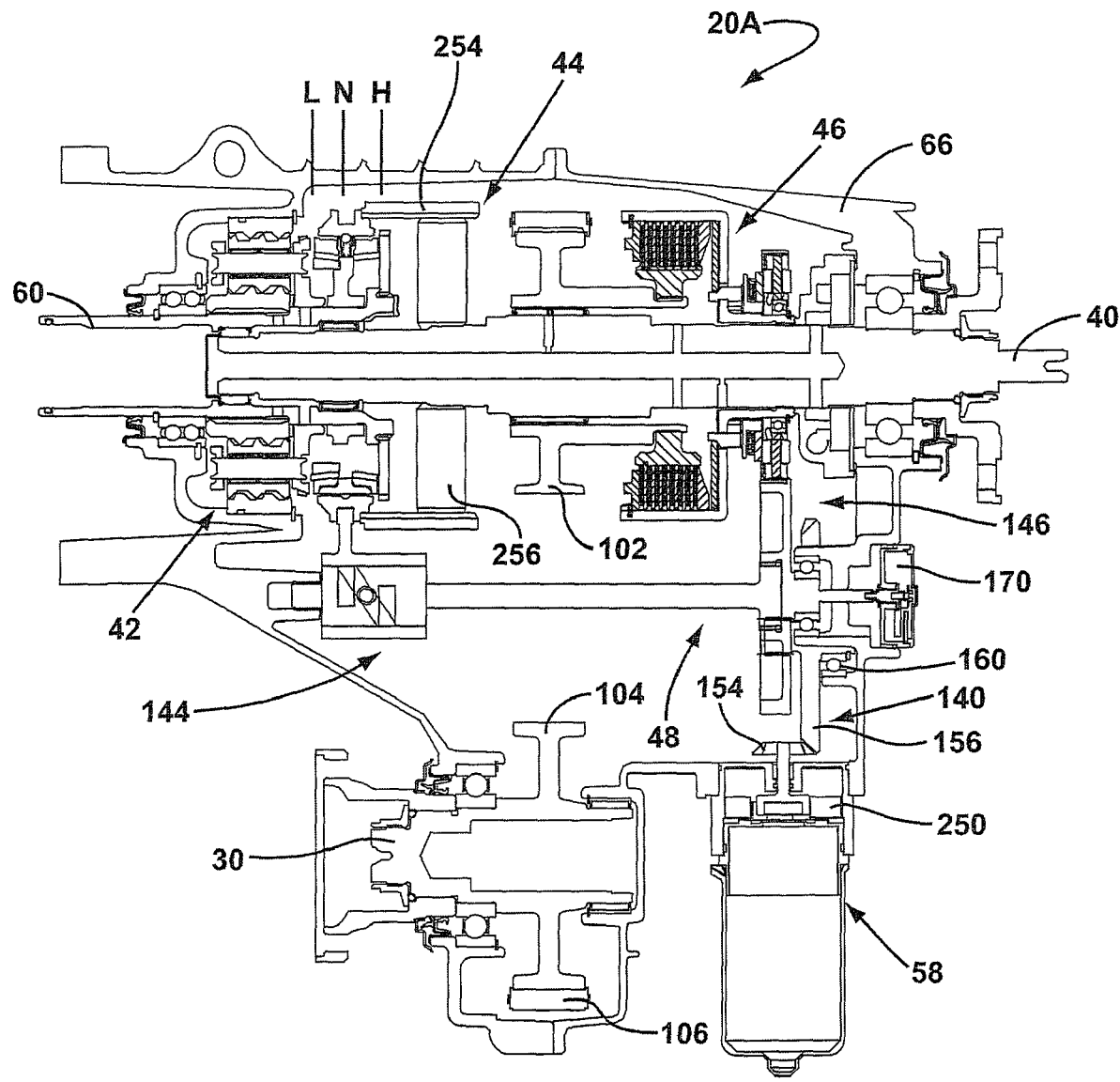
FIG. 12 is a sectional view of a two-speed on-demand transfer case according to an alternative preferred embodiment of the present invention.

When on-demand transfer case 20A of FIG. 12 is used in association with vehicle 10 of FIG. 1, mode select mechanism 54 would permit selection of a variety of available modes including, for example, a two-wheel high-range (2WH) drive mode, an on-demand four-wheel high-range (AUTO-4WH) drive mode, a part-time four-wheel high-range (LOCK-4WH) drive mode, a Neutral mode, and a part-time four-wheel low-range (LOCK-4WH) drive mode. Specifically, in the 2WH drive mode, geartrain 140 would be rotated until face cam 202 and rollers 220A and 220B on control gear 200 are located in the positions shown in FIG. 11A. As such, shift collar 84 would be located in its H range position and clutch assembly 46 would be released such that all drive torque is delivered to rear output shaft 40. In the AUTO-4WH mode, shift collar 84 would be located in its H range position and engagement of clutch assembly 46 would be continuously varied based on the value of the sensor signals to vary the torque distribution ratio between rear output shaft 40 and front output shaft 30 in a range between 100:0 and 50:50. This mode is established by controlling rotation of geartrain 140 for moving rollers 220A and 220B on control gear 200 relative to face cam 202 between the positions shown in FIGS. 11B and 11C. In the LOCK-4WH position, actuation mechanism 48 rotates geartrain 140 to the position shown in FIG. 11C, whereby shift collar 84 would still be located in its H range position and clutch assembly 46 would be fully engaged to effectively couple front output shaft 30 to rear output shaft 40. Selection of the Neutral mode causes actuator mechanism 48 to rotate geartrain 140 for locating face cam 200 and rollers 220A and 220B on control gear 200 in the positions shown in FIG. 11D. Since shift collar 84 is located in its N range position, no drive torque is transferred to rear driveshaft 40. When the LOCK-4WL mode is selected, ECU 56 controls actuation mechanism 48 to rotate geartrain 140 to the position shown in FIG. 11G, whereby shift collar 84 is located in its L range position while fully engaging clutch assembly 46 is fully engaged.

The arrangement described for power-operated actuation mechanism 48 is an improvement over the prior art in that the torque amplification provided by reduction gearset 140 combined with the force amplification provided by mode actuator assembly 146 and disk levers 128 permit use of a small low-power electric motor and yet provides extremely quick response and precise control over the position of face cam 202. In addition, since the axially-directed clutch engagement force is inversely proportional to the radial position of the rollers, the design engineer can use the radius as a variable for selectively increasing or decreasing the mechanical advantages. A face cam configured to move the rollers radially inward would function to increase the mechanical advantage for a given face cam taper profile or lead. Conversely, a face cam configured to move the rollers radially outward would function to decrease the mechanical advantage. If a constant mechanical advantage is desired, the lead of the cam surfaces could be varied to compensate for the change in mechanical advantage resulting from changes in the radial position of the rollers.

Figure 13:
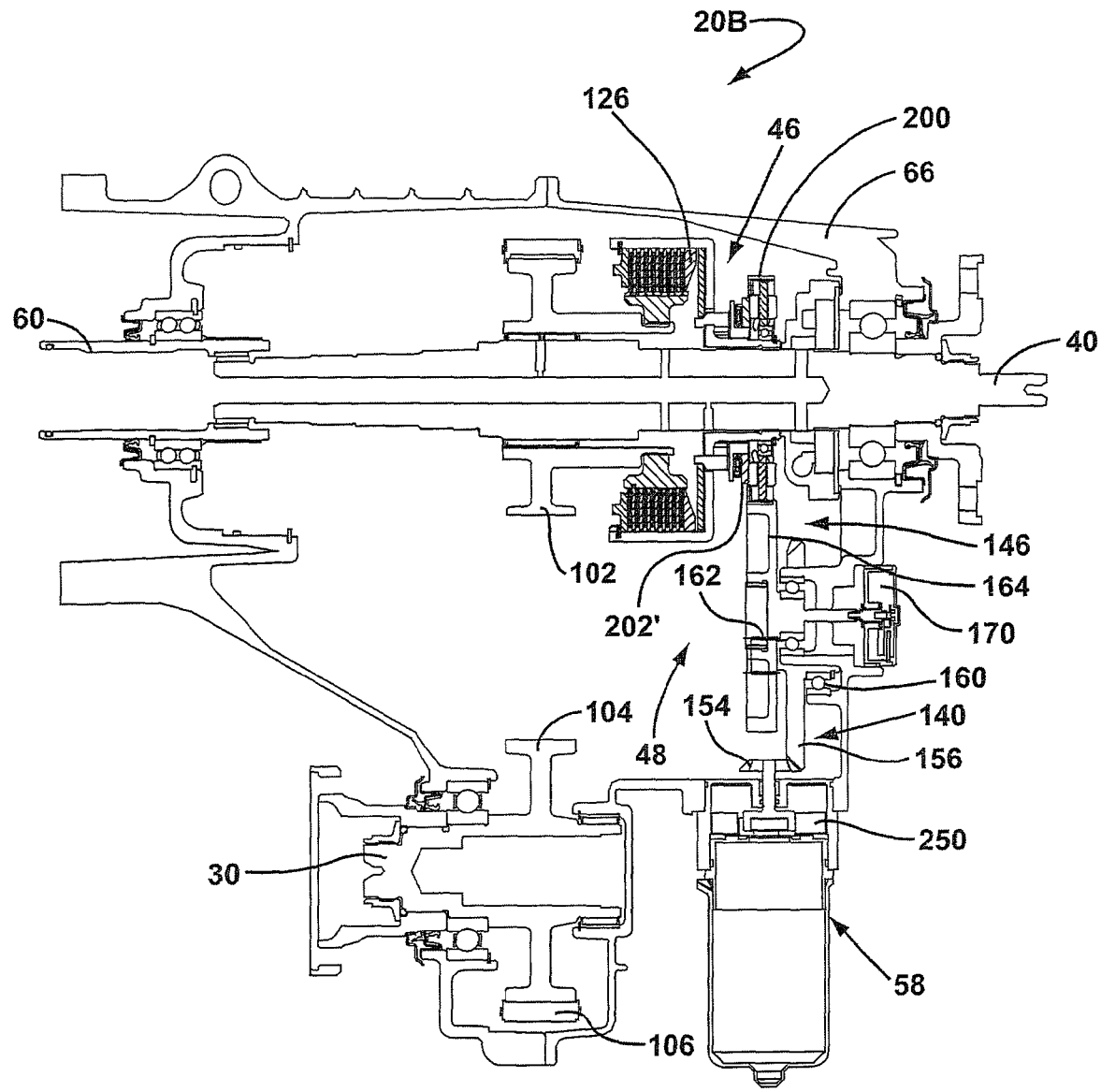
FIG. 13 is a sectional view of a single-speed on-demand transfer case according to yet another preferred embodiment of the present invention.

Transfer cases 20 and 20A were both shown to include two-speed range unit 42 with power-operated actuation mechanism 48 operable to coordinate actuation of range unit 42 with that of mode clutch assembly 46. However, the advantages provided by spiral or otherwise non-constant radius cam surfaces on face cam 202 in cooperation with radially-moveable rollers 220 are not limited to such applications. Specifically, power-operated actuation mechanism 48 can be modified to only control adaptive engagement of a friction clutch for use in various power transmission devices. To illustrate this feature, FIG. 13 shows a single-speed transfer case 20B which is a revised version of transfer case 20A in that range unit 42 and range actuator assembly 144 have been eliminated with input shaft 60 coupled (i.e., splined) to rear output shaft 40. Due to the similarity or many components, common reference numerals are used to identify components previously disclosed.

Transfer case 20B is operable to establish a two-wheel drive mode (2WD), a part-time four-wheel drive mode (4WD) and an automatic or on-demand four-wheel drive mode (AWD). Specifically, the 2WD mode is established when face cam 202' is axially located in its retracted position such that pressure plate 126 is located in its released position, thereby releasing engagement of mode clutch assembly 46. The 4WD mode is established when face cam 202' is located in its extended position for locating pressure plate 126 in its locked position, thereby fully engaging mode clutch assembly 46. The AWD mode is established by controlling axial movement of face cam 202' between its adapt and extended positions for moving pressure plate 126 between its ready and locked positions thereby adaptively controlling the transfer of torque from rear output shaft 40 to front output shaft 30.

Figure 8:
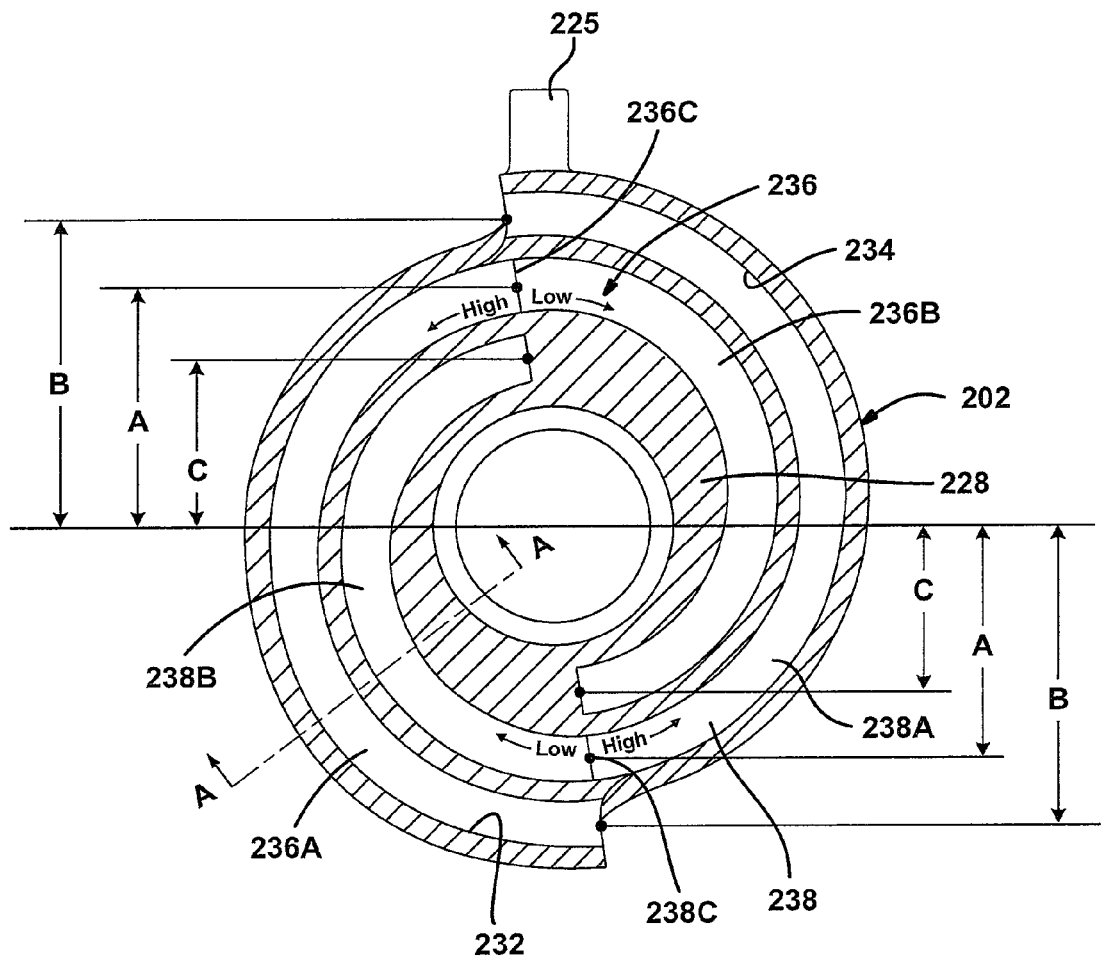
FIG. 8 is a side view of a face cam associated with the roller ramp unit.
Figure 14:
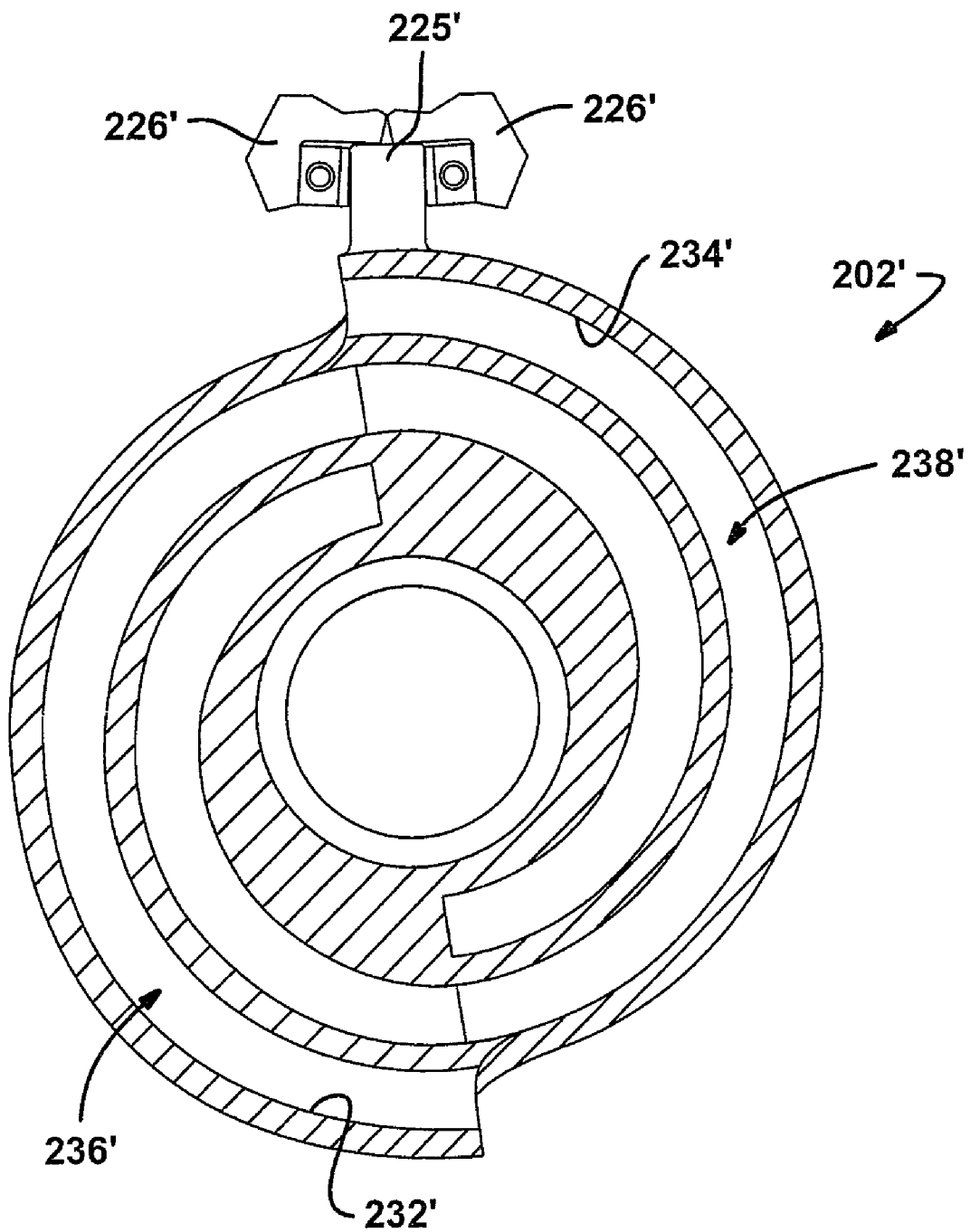
FIG. 14 illustrates a modified face cam associated with the roller ramp unit shown in FIG. 13.

Face cam 202' is shown in FIG. 14 to be generally similar to face cam 202 of FIG. 8 except that a first channel 232' and a second channel 234' define corresponding first and second cam surfaces 236' and 238' that are each configured to provide uni-directional clutch control feature. In particular, lug 225' is shown retained between a pair of stops 226' provided for prohibiting rotation of face cam 202' while permitting its axial movement. In accordance with one embodiment, the contour of cam surfaces 236' and 238' are configured to move rollers 220A and 220B on control gear 200 radially inwardly to cause axial movement of face cam 202' from its retracted position toward its extended position. As an alternative, cam surface 236' and 238' can be configured to move rollers 220A and 220B on control gear 200 radially outward to cause axial movement of face cam 202' from its retracted position toward its extended position. With this arrangement almost 360° of angular travel of rollers 220A and 220B within channels 232' and 234' is provided to accommodate precise actuation of mode clutch assembly 46.

The above-referenced embodiments clearly set forth the novel and unobvious features, structure and/or function of the present invention. However, one skilled in the art will appreciate that equivalent elements and/or arrangements made be used which will be covered by the scope of the following claims.

What is claimed is:

1. A power transmission device for a motor vehicle, comprising:
a first shaft;
a second shaft;
a clutch for transferring torque between the first and second shafts;
an electric motor; and
a clutch actuation system including a drive member and a cam member in cooperation with one another, the drive member being driven by the electric motor and including first and second rollers rotatably mounted thereon, the cam member including first and second circumferentially extending channels each having a continually reducing radius, the first and second channels being separate from and extending beside one another, the first roller being positioned within the first channel engaging the drive member and the cam member, the second roller being positioned within the second channel engaging the drive member and the cam member such that relative rotation between the drive member and the cam member translates the cam member along an axis of relative rotation to vary a magnitude of force applied to the clutch.

2. The power transmission device of claim 1 wherein the drive member includes radially extending first and second pins on which the first and second rollers are rotatably supported, respectfully.

3. The power transmission device of claim 2 wherein the first and second rollers are axially translated along the first and second pins during relative rotation between the drive member and the cam member based on the continually reducing radius of the first and second channels.

4. The power transmission device of claim 3 wherein the first and second rollers are substantially diametrically opposed to one another.

5. The power transmission device of claim 1 wherein the depth of the first and second channels varies.

6. The power transmission device of claim 1 wherein the cam member and the drive member each include apertures, one of the first and second shafts extending through the apertures.

7. The power transmission device of claim 6 wherein the clutch includes a drum coupled for rotation with one of the first and second shafts and a plurality of friction plates, the drum including a sleeve segment rotatably supporting the cam member.

8. The power transmission device of claim 7 wherein the clutch actuation system further includes an axially moveable thrust member for transferring force between the cam member and the friction plates, the thrust member including a plurality of spaced apart thrust pins extending through the drum.

9. The power transmission device of claim 1 wherein the clutch actuation system includes an anti-rotation member on the cam member adapted to engage a first stationary member when the cam member is rotated with the drive member in a first direction and engage a second stationary member when the cam member is rotated with the drive member in a second direction.

10. The power transmission device of claim 1 wherein the drive member includes teeth in constant meshed engagement with gear teeth formed on a gear driven by the electric motor.

11. A power transmission device for use in a motor vehicle having a powertrain and a driveline, comprising:
an input shaft adapted to be driven by the powertrain;
an output shaft adapted to drive the driveline;
a clutch for selectively transmitting drive torque between the input shaft and the output shaft;
an electric motor for rotating a driveshaft; and
a clutch operator including a first member rotatably driven by the driveshaft, a second member moveable between first and second positions for controlling the magnitude of a clutch engagement force applied to the clutch, and a cam mechanism for converting rotary movement of the first member into axial movement of the second member, the cam mechanism including a roller rotatably mounted to the first member and a spiral channel formed in the second member within which the roller is disposed, the channel having a cam surface engaged by the roller and configured to cause radial movement of the roller and axial movement of the second member between its first and second positions in response to rotation of the first member relative to the second member, wherein the first member includes first and second radially extending pins positioned substantially diametrically opposed to one another, the roller being supported on the first pin, the cam mechanism including another roller being supported for rotation on the second pin and engaging the second member, and further wherein the second member includes another spiral channel in which the another roller is disposed, the another spiral channel being separate from and extending beside the spiral channel associated with the roller.

12. The power transmission device of claim 11 wherein the clutch operator includes an anti-rotation member on the second member adapted to engage a first stationary member when the second member is rotated with the first member in a first direction and engage a second stationary member when the second member is rotated with the first member in a second direction.

13. The power transmission device of claim 11 wherein the clutch operator is operable to prevent relative rotation between the first and second members in response to rotation of the first member through a first range of rotary travel and is further operable to permit rotation of the first member relative to the second member in response to rotation of the first member through a second range of rotary travel.

14. The power transmission device of claim 13 wherein rotation of the first member through its second range of travel causes an anti-rotation member on the second member to engage a stationary member such that the first member rotates relative to the second member, whereby such relative rotation causes the roller to ride on the cam surface and forcibly move the second member from its first position toward its second position.

15. The power transmission of claim 14 wherein the cam surface includes a first ramp segment for causing axial movement of the second member from its first position toward its second position when the first member is rotated in a first direction following engagement of the anti-rotation member with the stationary member, and wherein the cam surface includes a second ramp segment for causing axial movement of the second member from its first position toward its second position when the first member is rotated in a second direction following engagement of the anti-rotation member with a second stationary member.

16. The power transmission device of claim 11 wherein the second member includes an aperture in receipt of one of the input and output shafts.

17. The power transmission device of claim 16 wherein the first member includes an aperture in receipt of one of the input and output shafts.

18. The power transmission device of claim 11 wherein the clutch includes a drum coupled for rotation with one of the input and output shafts and a plurality of friction plates, the drum including a sleeve segment rotatably supporting the second member.

* * * * *